(12) United States Patent
Mizumaki

(10) Patent No.: US 7,781,924 B2
(45) Date of Patent: Aug. 24, 2010

(54) ELECTROMAGNETIC DRIVING APPARATUS

(75) Inventor: Masao Mizumaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 370 days.

(21) Appl. No.: 11/459,813

(22) Filed: Jul. 25, 2006

(65) Prior Publication Data
US 2007/0018514 A1    Jan. 25, 2007

(30) Foreign Application Priority Data
Jul. 25, 2005    (JP)    ............................ 2005-214899

(51) Int. Cl.
*H02K 37/14* (2006.01)
*H02K 1/12* (2006.01)
*H02K 7/09* (2006.01)
*H02K 37/00* (2006.01)
*H02K 37/04* (2006.01)
*H02K 37/10* (2006.01)
*H02K 37/12* (2006.01)
*H02K 37/16* (2006.01)

(52) U.S. Cl. .............. 310/49.35; 310/49.01; 310/49.32; 310/49.33; 310/49.34; 310/49.37; 310/49.39; 310/90.5; 310/257

(58) Field of Classification Search .................. 310/46, 310/257, 49, 49 R, 254, 162, 179, 164, 156, 310/49 A, 90.5, 49.01, 49.32–49.35, 49.37, 310/49.39; H02K 1/12, 21/12, 21/14, 21/16, H02K 7/09, 37/00, 37/04, 37/10, 37/12, 37/14, H02K 37/16
See application file for complete search history.

(56) References Cited

U.S. PATENT DOCUMENTS

| | | | | |
|---|---|---|---|---|
| 6,127,764 | A * | 10/2000 | Torok ........................ | 310/269 |
| 6,316,851 | B1 * | 11/2001 | Maegawa et al. ......... | 310/49 R |
| 6,411,003 | B1 * | 6/2002 | Sasaki et al. ........... | 310/156.02 |
| 6,812,599 | B2 * | 11/2004 | Matsushita et al. ........ | 310/49 R |
| 6,838,792 | B2 * | 1/2005 | Matsushita et al. ........ | 310/49 R |
| 2002/0047336 | A1 * | 4/2002 | Aoshima .................. | 310/49 R |
| 2004/0080233 | A1 * | 4/2004 | Matsushita et al. .......... | 310/257 |
| 2004/0212274 | A1 * | 10/2004 | Mizumaki .................... | 310/254 |
| 2005/0218743 | A1 * | 10/2005 | Mizumaki .................... | 310/185 |

(Continued)

FOREIGN PATENT DOCUMENTS

JP    9-331666 A    12/1997

(Continued)

*Primary Examiner*—Quyen Leung
*Assistant Examiner*—Michael Andrews
(74) *Attorney, Agent, or Firm*—Rossi, Kimms & McDowell LLP

(57) ABSTRACT

A drive apparatus which is small in size, short in axial length, low in cost, and high in output. A stepping motor as the driving apparatus includes a first coil, a second coil, a magnet, and a rotor comprised of a core and a rotary shaft. First through fourth outer magnetic pole portions are opposed to the outer peripheral surface of the magnet with a predetermined gap between them. The first and the second coils are disposed adjacent to the magnet in an axial direction of the rotary shaft and disposed at respective ends of the rotary shaft. The first and second outer magnetic pole portions are inserted inside the first and second coils, respectively. As viewed in the circumferential direction of the magnet, the third and fourth outer magnetic pole portions are disposed close to the first and second outer magnetic pole portions, respectively.

6 Claims, 14 Drawing Sheets

U.S. PATENT DOCUMENTS

2005/0236914 A1* 10/2005 Horiike .................. 310/49 R
2006/0055253 A1* 3/2006 Mizumaki .............. 310/49 R

FOREIGN PATENT DOCUMENTS

| JP | 10-62836 A | 3/1998 |
| JP | 2002-142431 A | 5/2002 |
| JP | 2003-23763 A | 1/2003 |

* cited by examiner

ELECTROMAGNETIC DRIVING APPARATUS

BACKGROUND OF THE INVENTION

1. Field of the Invention

The present invention relates to a drive apparatus, and more particularly, to a drive apparatus suitable to realize a small-sized stepping motor with increased output.

2. Description of the Related Art

Conventionally, stepping motors have been widely used as driving sources for various apparatuses. As a first conventional example, there has been proposed a stepping motor which has a small diameter centering on a rotary shaft of the motor and has high output (see Japanese Laid-Open Patent Publication (Kokai) No. H09-331666, for example).

FIG. 13 is an exploded perspective view showing the construction of the stepping motor according to the first conventional example, and FIG. 14 is a longitudinal sectional view showing the internal construction of the stepping motor in an assembled state.

As shown in FIGS. 13 and 14, the stepping motor is comprised of a first stator 204, a second stator 205, a coupling ring 207, an output shaft 206, and a rotor 201.

The first stator 204 and the second stator 205 are each made of a soft magnetic material and opposed to each other with a predetermined gap therebetween as viewed in the axial direction of the motor (i.e. the direction in which the output shaft 206 of the motor extends). The coupling ring 207 is made of a non-magnetic material and holds the first stator 204 and the second stator 205 with the predetermined gap. The output shaft 206 is rotatably supported by a bearing 204E of the first stator 204 and a bearing 205E of the second stator 205. The rotor 201 is made of a magnet (permanent magnet) and fixed to the output shaft 206. This magnet is circumferentially divided into four pieces and alternately magnetized to different polarities. That is, the magnet is magnetized to four poles.

The first stator 204 having a tooth-shaped end is comprised of first outer magnetic pole portions 204A and 204B which are opposed to an outer peripheral surface of the rotor 201 with a predetermined gap therebetween, and first inner magnetic pole portions 204C and 204D which are opposed to an inner peripheral surface of the rotor 201 with a predetermined gap therebetween. The second stator 205 having a tooth-shaped end is comprised of second outer magnetic pole portions 205A and 205B which are opposed to the outer peripheral surface of the rotor 201 with a predetermined gap therebetween, and second inner magnetic pole portions 205C and 205D which are opposed to the inner peripheral surface of the rotor 201 with a predetermined gap therebetween.

On the first inner magnetic pole portions 204C and 204D, a first coil 202 for exciting the first stator 204 is wound adjacent to one side of the rotor 201 as viewed in the axial direction of the motor. Also, on the second inner magnetic pole portions 205C and 205D, a second coil 203 for exciting the second stator 205 is wound adjacent to the other side of the rotor 201 as viewed axially of the motor.

In the stepping motor constructed as described above, to rotate the rotor 201, the energizing direction of the first coil 202 and that of the second coil 203 are sequentially switched. As a result, the polarities of the first outer magnetic pole portions 204A and 204B, the first inner magnetic pole portions 204C and 204D, the second outer magnetic pole portions 205A and 205B, and the second inner magnetic pole portions 205C and 205D are sequentially switched, causing the rotor 201 to rotate.

In the stepping motor, a magnetic flux generated by energization of the coil flows from the outer magnetic pole portion to the inner magnetic pole portion opposed to the outer magnetic pole portion, or from the inner magnetic pole portion to the outer magnetic pole portion opposed thereto, thereby acting efficiently on the magnet located between the outer magnetic pole portion and the inner magnetic pole portion. Further, the distance between the outer magnetic pole portions and the inner magnetic pole portions can be reduced to the order of the thickness of the magnet having a cylindrical shape, making it possible to reduce the resistance of a magnetic circuit formed by the outer magnetic pole portion and the inner magnetic pole portion. Accordingly, many magnetic fluxes can be generated with a small amount of electric current, resulting in an increased output.

As a second conventional example, a stepping motor with a reduced outer diameter has been proposed (see Japanese Laid-Open Patent Publication (Kokai) No. 2002-142431, for example).

This stepping motor is comprised of a long yoke, a short yoke, a bobbin case, a first stator, a rotor, and a case.

The first stator is constructed to have the bobbin inserted in the long yoke, the bobbin case, and the short yoke. The long yoke has an annular portion and sawtooth-shaped pole teeth protruding from an outer peripheral edge of the annular portion. The pole teeth of the short yoke are shorter than those of the long yoke. The long yoke and the short yoke are constructed such that their pole teeth are pointed in the same direction, each pole tooth of the short yoke is located between the pole teeth of the long yoke, and their ends coincide in position with one another. A cylindrical portion through which a pair of ring-plate shaped flanges are connected is provided between the long yoke and the short yoke. The cylindrical portion supports an annular bobbin case in which a coil held in a wound state is sandwiched.

The second stator is identical in construction with the first stator. The first and second stators are disposed to face each other, with their respective short yokes located thereinside and with their pole teeth facing each other. The rotor is disposed in the central hollows of the first and second stators. The case covers outer peripheral surfaces of the first and second stators.

According to the stepping motors disclosed in Japanese Laid-Open Patent Publication (Kokai) Nos. H09-331666 and 2002-142431, the axial lengths of the motors are determined depending on the heights of the two coils, the length of the magnet, and the thicknesses of the stators. Hence, the stepping motors are long in axial length. On the other hand, if the axial lengths of the stepping motors are shortened, output considerably decreases.

In the stepping motor disclosed in Japanese Laid-Open Patent Publication (Kokai) No. 2002-142431, a magnetic flux from the long yoke flows toward the short yoke. Since the shorter the distance, the more easily a magnetic flux can flow, most of magnetic fluxes pass through the vicinity of root portions of the short and long yokes which do not face the outer peripheral surface of the magnet, resulting in unsatisfactory magnetic efficiency and low output.

The assignee of the present application has proposed a stepping motor which solves the above described problems (see Japanese Laid-Open Patent Publication (Kokai) No. 2003-023763, for example).

This stepping motor is comprised of a rotor, a first outer magnetic pole portion, a first inner magnetic pole portion, a second outer magnetic pole portion, and a second inner magnetic pole portion.

The rotor is disposed for rotation and has a cylindrical magnet which is circumferentially divided and alternately magnetized to different polarities. The first outer magnetic pole portion, which is excited by a first coil, faces the outer peripheral surface of the magnet within a predetermined first angular range. The first inner magnetic pole portion, which is excited by the first coil, faces the inner peripheral surface of the magnet. The second outer magnetic pole portion excited by a second coil faces the outer peripheral surface of the magnet within a predetermined second angular range. The second inner magnetic pole portion excited by the second coil faces the inner peripheral surface of the magnet. The first outer magnetic pole portion and the second outer magnetic pole portion are arranged on the same circumference centering on the magnet.

The stepping motor disclosed in Japanese Laid-Open Patent Publication (Kokai) No. 2003-023763 can be shortened in axial length. This stepping motor, however, is constructed such that all the outer magnetic pole portions are arranged inside the coils as viewed in the radial direction of the stepping motor. For this reason, when an attempt is made to reduce the outer diameter of the stepping motor, a range in which the outer magnetic pole portions are opposed to the outer peripheral surface of the magnet is limited (i.e., there is a wide area of the outer periphery of the magnet to which the outer magnetic pole portions are not opposed), resulting in reduced output.

The stepping motors disclosed in Japanese Laid-Open Patent Publication (Kokai) Nos. H09-331666 and 2003-023763 are each required to have a predetermined gap between the inner peripheral surface of the magnet and the inner magnetic pole portions opposed thereto, and the gap management at the manufacturing process results in an increase in costs. Further, the stator needs to be provided with the cylindrical inner magnetic pole portions and outer magnetic pole portions. On the other hand, it is difficult to integrally construct the inner magnetic pole portions and the outer magnetic pole portions in the part manufacturing process. If these magnetic pole portions are manufactured separately, and thereafter integrally assembled, the number of parts is increased and cost is increased.

On the other hand, a camera blade drive mechanism employing a stepping motor which is high in magnetic efficiency and short in axial length has been proposed (see Japanese Laid-Open Patent Publication (Kokai) No. H10-62836, for example).

The camera blade drive mechanism is comprised of a bottom plate, a light-shielding blade, a rotor, a drive member, two yoke members, a coil, and a magnetic material member.

The bottom plate is a member which has an exposure aperture. The light-shielding blade is comprised of at least one blade which opens and closes the exposure aperture. The rotor has a permanent magnet which is multipolar-magnetized and disposed laterally of the exposure aperture with a rotary shaft thereof disposed parallel with an optical axis. The drive member is operated with rotation of the rotary shaft and causes the light-shielding blade to open and close. The two yoke members are so arranged as to sandwich the rotator, and one end of each yoke is opposed to the peripheral surface of the rotor over a predetermined angle range. The coil is wound around at least one of the two yoke members. The magnetic material member magnetically couples the other ends of the respective two yoke members to each other and has at least one overhang portion.

In a state where the stepping motor stops rotating, the overhang portion of the magnetic member extends to the vicinity of a magnetic pole of the rotor different from a magnetic pole to which one end of each yoke member is opposed. Specifically, when the stepping motor stops rotating, the magnetic pole of the rotor which is not opposed to one end of each yoke member is positively used so as to improve magnetic efficiency.

Although the stepping motor disclosed in Japanese Laid-Open Patent Publication (Kokai) No. H10-62836 is short in axial length, it is constructed to include a connecting yoke that connects the two yoke members together, and hence the number of parts is increased and cost is high. In addition, magnetic efficiency is poor since a magnetic loss occurs due to connection of the yokes.

Also, a magnetic flux from one end of one of the two yoke members flows toward the overhang portion of the magnetic member and one end of the other yoke, and hence the magnetic circuit is long in length and high in magnetic resistance. For this reason, magnetic efficiency is poor.

Further, since only one of the two coils is energized in running the stepping motor, output is remarkably lower as compared with an ordinary two-phase stepping motor in which alternating current is passed through two coils at the same time.

SUMMARY OF THE INVENTION

It is an object of the present invention to provide a drive apparatus which is small in size, short in axial length, low in cost, and high in output.

To attain the above object, according to the present invention, there is provided a drive apparatus which comprises: a cylindrical magnet that is circumferentially multipolar-magnetized and has inner and outer peripheral surfaces; a rotor made of a soft magnetic material and fixed to the inner peripheral surface of the magnet; first and second outer magnetic pole portions disposed at respective positions which are phase-shifted from each other by a predetermined angle with respect to the rotation center of the magnet and opposed to the outer peripheral surface of the magnet with a predetermined gap therebetween; third and fourth outer magnetic pole portions disposed at positions corresponding to the first and second outer magnetic pole portions, respectively, and opposed to the outer peripheral surface of the magnet with a predetermined gap therebetween; a first annular coil that excites the first and third outer magnetic pole portions; a second annular coil that excites said second and fourth outer magnetic pole portions, wherein the first coil and the second coil are disposed adjacent to the magnet in the axial direction of the rotor, the first outer magnetic pole portion is inserted inside the first coil, the second outer magnetic pole portion is inserted inside the second coil, the third outer magnetic pole portion is disposed close to the first outer magnetic pole portion in the circumferential direction of the magnet, and the fourth outer magnetic pole portion is disposed close to the second outer magnetic pole portion in the circumferential direction of the magnet.

According to the present invention, since the first and second outer magnetic pole portions and the third and fourth outer magnetic pole portions are disposed outside the magnet, and the first and second coils are disposed adjacent to the magnet as viewed in the axial direction of the rotor, the drive apparatus can be short in axial length. A magnetic flux generated by energization of the first coil is passed between the first outer magnetic pole portion and the rotor, and a magnetic flux generated by energization of the second coil is passed between the second outer magnetic pole portion and the rotor, so that both of these magnetic fluxes can effectively act on the magnet, increasing the output of the drive apparatus. As a result, the small-sized and low-cost drive apparatus which is short in axial length and has high output can be realized.

Preferably, the first and second outer magnetic pole portions extend toward the third and fourth outer magnetic pole portions along the rotational axis of the rotor, respectively, and the third and fourth outer magnetic pole portions extend toward the first and second outer magnetic pole portions along the rotational axis of the rotor, respectively.

According to this preferred form, the outer diameter of the stepping motor can be reduced.

Still preferably, the rotor includes a rotary shaft, a first stator with which the first and second outer magnetic pole portions are integrally formed is disposed at one end of the rotary shaft of the rotor, and a second stator with which the third and fourth outer magnetic pole portions are integrally formed is disposed at another end of the rotary shaft of the rotor.

Still preferably, the first stator and the second stator include first and second flat plate portions, respectively, extending orthogonally to the rotary shaft of the rotor, the first and second outer magnetic pole portions extend from the first flat plate portion toward the third and fourth outer magnetic pole portions, respectively, and the third and fourth outer magnetic pole portions extend from the second flat plate portion toward the first and second outer magnetic pole portions, respectively.

According to these two preferred forms, errors in the relative positions of the first and second outer magnetic pole portions and errors in the relative positions of the third and fourth outer magnetic pole portions can be reduced. As a result, a variation in the performance of the stepping motor can be reduced.

Preferably, the rotor includes a core and a rotary shaft which is inserted into the core, a part of the core which is opposed to the first outer magnetic pole portion forms a first inner magnetic pole portion that generates a magnetic flux crossing the magnet between the just-mentioned part of the core and the first outer magnetic pole portion when the first coil is energized, and a part of the core which is opposed to the second outer magnetic pole portion forms a second inner magnetic pole portion that generates a magnetic flux crossing the magnet between the part of the core and the second outer magnetic pole portion when the second coil is energized.

According to this preferred form, the magnetic flux generated between the first outer magnetic pole portion and the first inner magnetic pole portion when the first coil is energized and the magnetic flux generated between the second outer magnetic pole portion and the second inner magnetic pole portion when the second coil is energized can effectively act on the magnet. As a result, the output of the stepping motor can be increased.

Preferably, the rotor includes a core and a rotary shaft which is inserted into the core, the core and the rotary shaft being formed separately from each other.

According to this preferred form, a material for the rotor and a material for the rotary shaft can be individually selected, thereby improving the performance of the stepping motor.

Alternatively, the rotor includes a core and a rotary shaft which is inserted into the core, and the core and the rotary shaft being formed integrally with each other.

According to this preferred form, the number of parts and cost can be reduced.

Preferably, the stepping motor includes a bobbin around which both the first coil and the second coil are wound, and the bobbin includes a cover portion for covering the magnet.

According to this preferred form, the stepping motor does not require a dedicated cover for covering the magnet, and therefore, the number of parts and cost can be reduced.

The above and other objects, features, and advantages of the invention will become more apparent from the following detailed description taken in conjunction with the accompanying drawings.

DETAILED DESCRIPTION OF THE PREFERRED EMBODIMENTS

The present invention will be described in detail below with reference to the drawings showing preferred embodiments thereof.

First, a description will be given of a drive apparatus according to a first embodiment of the present invention.

Figure 1:
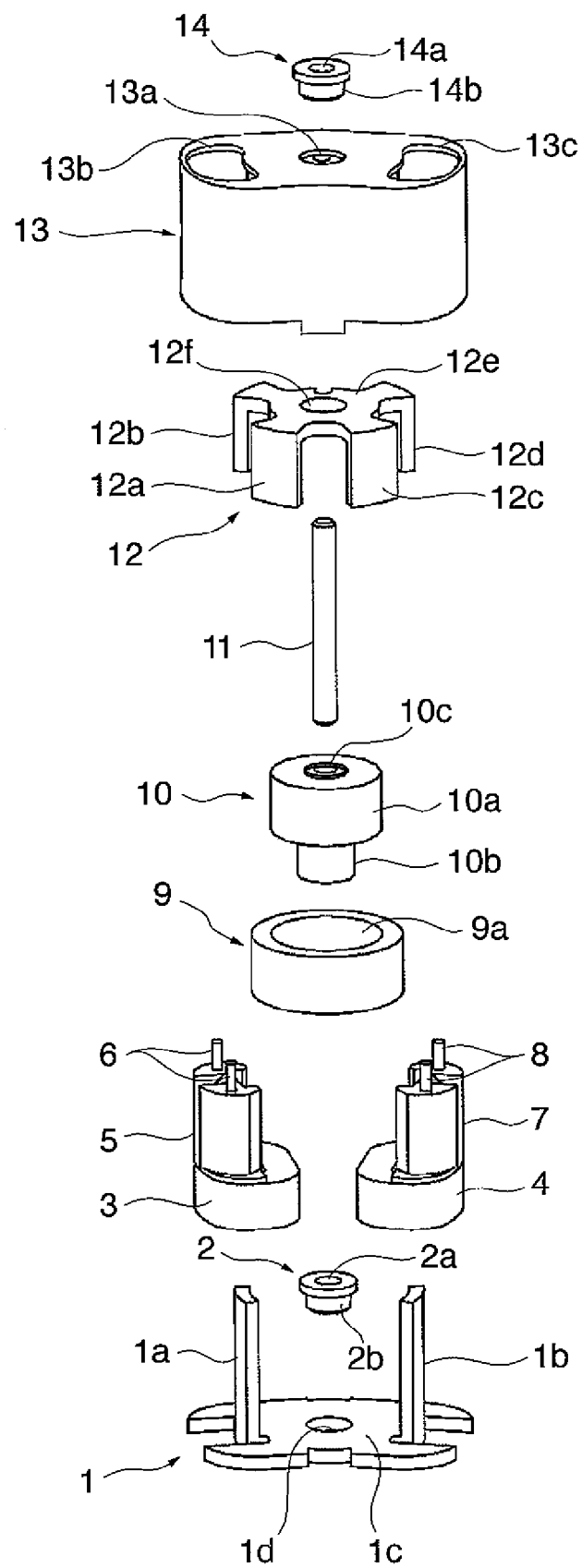
FIG. 1 is an exploded perspective view showing a stepping motor which is a drive apparatus according to a first embodiment of the present invention.
Figure 2:
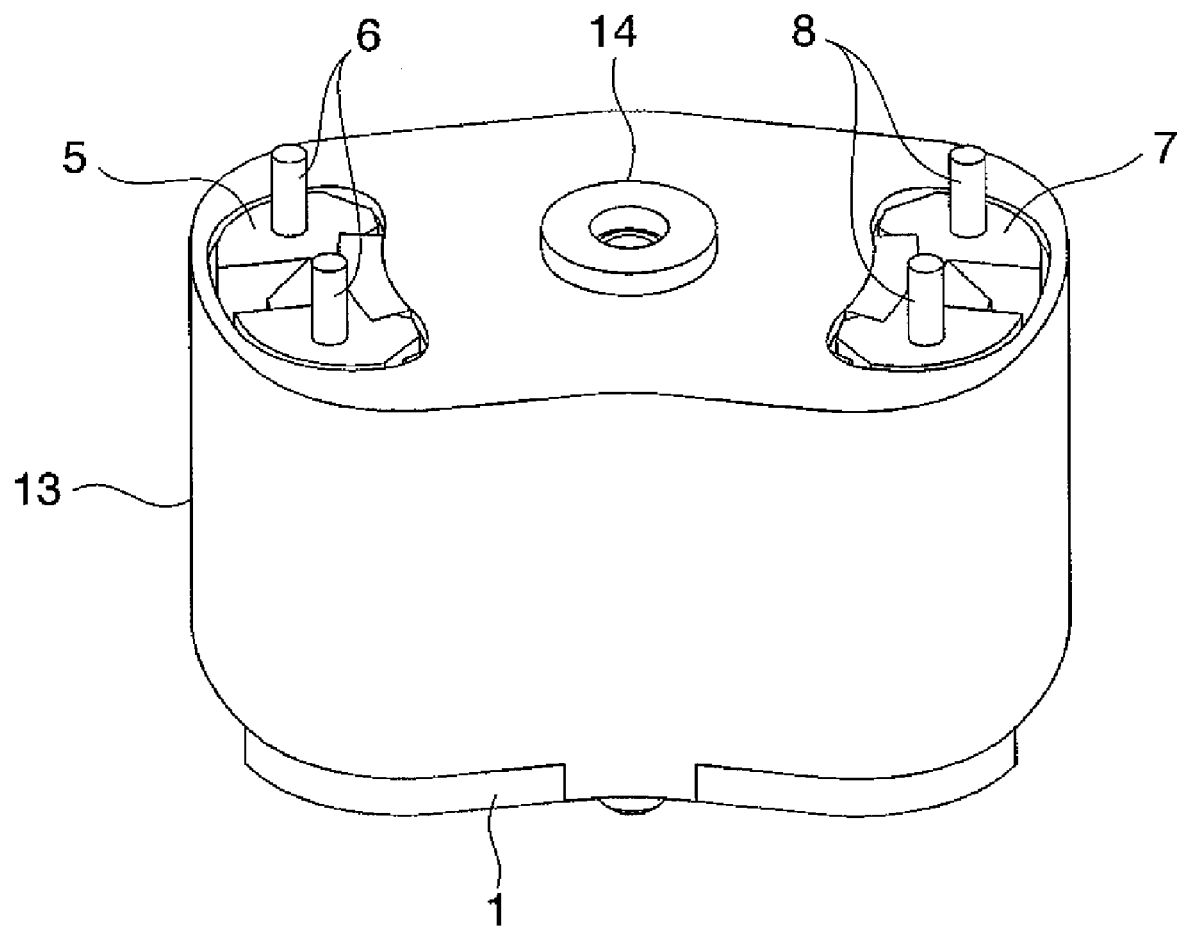
FIG. 2 is a perspective view showing the stepping motor in FIG. 1 in an assembled state.
Figure 3:
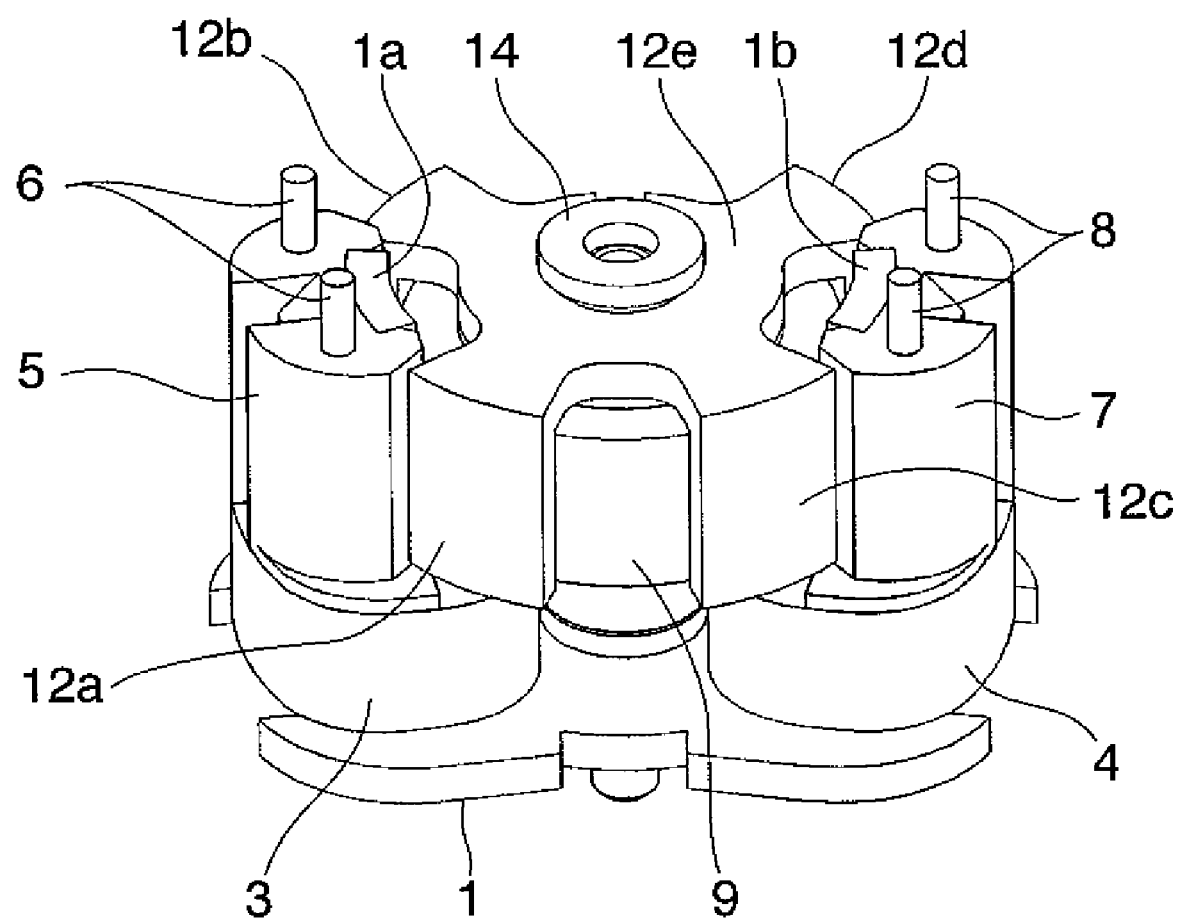
FIG. 3 is a perspective view showing the stepping motor in FIG. 1 with its cover omitted.
Figure 4:
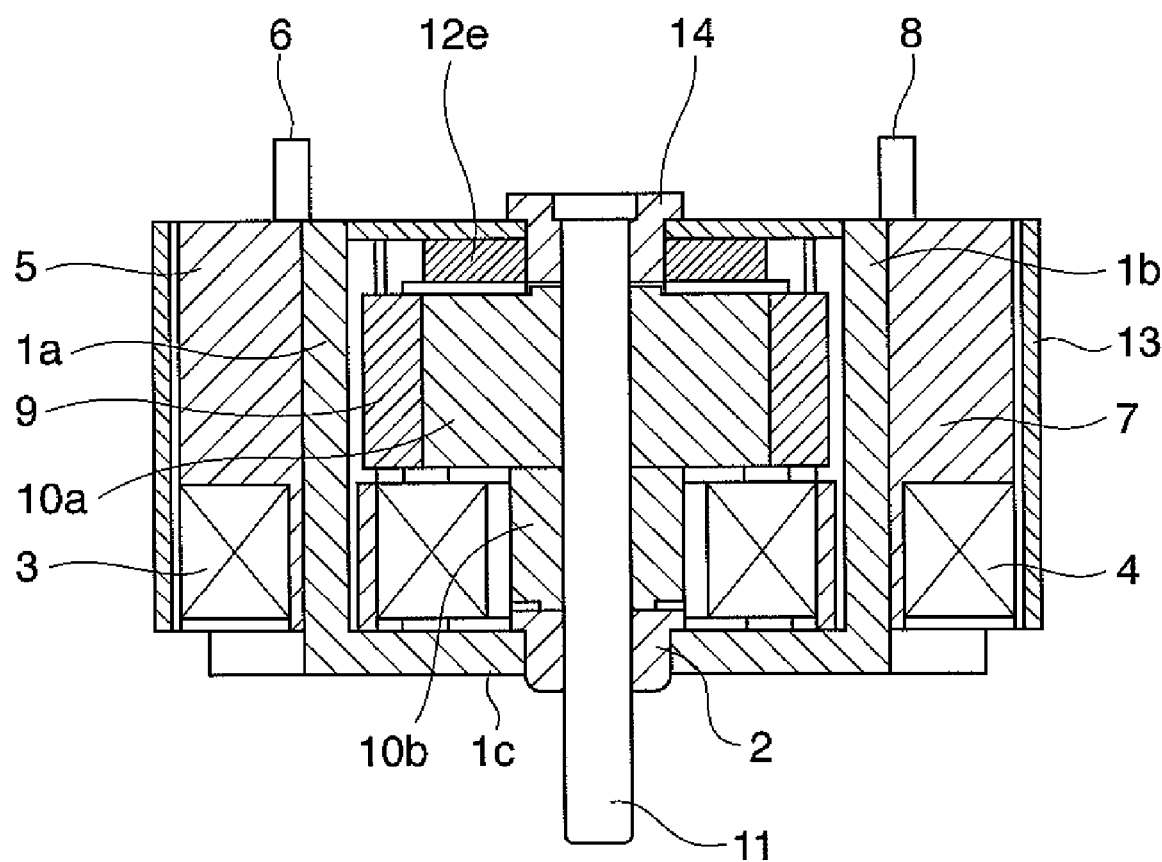
FIG. 4 is a longitudinal sectional view showing the internal construction of the stepping motor in FIG. 1.

FIG. 1 is an exploded perspective view showing a stepping motor which is a drive apparatus according to the first embodiment. FIG. 2 is a perspective view showing the stepping motor in FIG. 1 in an assembled state. FIG. 3 is a perspective view showing the stepping motor in FIG. 1 with its cover omitted. FIG. 4 is a longitudinal sectional view showing the internal construction of the stepping motor.

As shown in FIGS. 1 to 4, the stepping motor is comprised of a first stator 1, a first bearing 2, a first coil 3, a second coil 4, a first bobbin 5, a second bobbin 7, a magnet 9, a core 10, a rotary shaft 11, a second stator 12, a cover 13, and a second bearing 14.

The first stator 1 is made of a soft magnetic material and is comprised of a first outer magnetic pole portion 1a, a second outer magnetic pole portion 1b, and a flat plate portion 1c formed integrally with both the magnetic pole portions 1a and 1b. The flat plate portion 1c is formed into an inverted-V shape with an open angle θ between the legs of the V (see FIG. 5). A hole 1d into which the first bearing 2 is to be pressed is formed in the center of the flat plate portion 1c.

The first outer magnetic pole portion 1a and the second outer magnetic pole portion 1b are simply bent into a tooth shape so that right angles are formed relative to the flat plate portion 1c after slits are made in both ends of the flat plate portion 1c. In the stepping motor in an assembled state, the magnetic pole portions 1a and 1b are disposed parallel with the rotary shaft (motor rotary shaft) 11 of a rotor, described later. Also, the first outer magnetic pole portion 1a and the second outer magnetic pole portion 1b are disposed at respective positions which are phase-shifted by a predetermined angle from each other with respect to the rotation center of the magnet 9 and disposed in opposed relation to the outer peripheral surface of the magnet 9 with a predetermined gap therebetween.

The first bearing 2 is made of a soft magnetic material and rotatably supports the rotary shaft 11 of the rotor. The first bearing 2 is comprised of a cylindrical portion and a fixed portion 2b which is smaller in diameter than the cylindrical portion. A shaft hole 2a is formed in the center of the cylindrical portion and the fixed portion 2b of the first bearing 2, and the rotary shaft 11 of the rotor is inserted into the shaft hole 2a. The fixed portion 2b is inserted into the hole 1d of the first stator 1.

The first bobbin 5 around which the first coil 3 is wound is fixed on the flat plate portion 1c while sandwiching the first outer magnetic pole portion 1a of the first stator 1. The first bobbin 5 is provided with two terminal pins 6 to which both ends of the first coil 3 are connected. The first bobbin 5 is notched so as to expose the first outer magnetic pole portion 1a of the first stator 1 (see FIG. 3).

The second bobbin 7 around which the second coil 4 is wound is fixed on the flat plate portion 1c while sandwiching the second outer magnetic pole portion 1b of the first stator 1. The second bobbin 7 is provided with two terminal pins 8 to which both ends of the second coil 4 are connected. The second bobbin 7 is notched so as to expose the second outer magnetic pole portion 1b of the first stator 1 (see FIG. 3).

The first coil 3 wound around the first bobbin 5 has both ends thereof connected to the terminal pins 6 to permit electrical conduction therethrough. The second coil 4 is wound around the second bobbin 7, and both ends thereof are connected to the terminal pins 8 to permit electrical conduction therethrough.

The magnet 9 is formed into a hollow cylindrical shape and includes an inner diameter portion 9a. The magnet is circumferentially multipolar-magnetized so that the number of permanently magnetized poles is equal to N (in the present embodiment, N=8). That is, as shown in FIGS. 5 to 8, the magnet 9 is permanently magnetized into S-pole and N-pole alternately in the circumferential direction. An inner peripheral surface of the magnet 9 may have a weak magnetization distribution as compared with the outer peripheral surface, may not be magnetized at all, or may be magnetized to a polarity opposite to a polarity of an outer peripheral surface (i.e. when a part of the outer peripheral surface is magnetized to an S-pole, the corresponding part of the inner peripheral surface is magnetized to an N-pole). The magnet 9 is fixed at inner diameter portion 9a to the outer periphery of a first cylindrical portion 10a of the core 10, described later, by bonding, for example, so that the axial end face of the magnet 9 can be flush with that of the first cylindrical portion 10a.

The core 10 is made of a soft magnetic material and comprised of the first cylindrical portion 10a and a second cylindrical portion 10b. A hole 10c is formed in the cylindrical portions 10a and 10b along the axis of the core 10 to extend therethrough. The cylindrical portion 10a of the core 10 is fixed to the inner diameter portion 9a of the magnet 9 by bonding, for example. The rotary shaft 11 is made of a soft magnetic material and is inserted and fixed into the hole 10c of the core 10. The core 10 and the rotary shaft 11 constitute the rotor. The position of the rotor in the axial direction of the motor is limited by the first bearing 2 and the second bearing 14 with a predetermined gap (see FIG. 4).

Although in the present embodiment, the core 10 and the rotary shaft 11 are manufactured separately and then integrally fixed to each other, the core 10 and the rotary shaft 11 may be configured as an integral member as in a second embodiment. If the core 10 and the rotary shaft 11 are configured as separate members, the rotary shaft 11 may be made of a material such as SUS with high strength and high abrasion resistance, and the core 10 may be made of a soft magnetic material such as SUY with high magnetic efficiency. If the core 10 and the rotary shaft 11 are configured as an integral member, cost can be reduced due to reduction in the number of parts, and also, the coaxial accuracy of the core 10 and the rotary shaft 11 can be improved.

The second stator 12 is comprised of a first outer tooth portion 12a, a second outer tooth portion 12b, a third outer tooth portion 12c, a fourth outer tooth portion 12d, and a flat plate portion 12e. The first to fourth outer tooth portions 12a to 12d are formed integrally with the flat plate portion 12e. The first to fourth outer teeth 12a to 12d are simply bent into a tooth shape to extend at substantially right angles relative to the flat plate portion 12e at a peripheral edge of the flat plate portion 12e of a plate-like member, not shown, having a shape equivalent to that of the developed second stator 12. The first to fourth outer tooth portions 12a to 12d are disposed parallel with the rotary shaft 11 of the rotor, described later. In the assembled state, the first to fourth outer tooth portions 12a to 12d face the outer magnetic pole portions 1a and 1b of the first stator 1. A hole 12f into which the second bearing 14 is pressed is formed in the center of the flat plate portion 12e.

The first outer tooth portion 12a and the second outer tooth portion 12b form a third outer magnetic pole portion, and the third outer tooth portion 12c and the fourth outer tooth portion 12d form a fourth outer magnetic pole portion. The third outer magnetic pole portion and the fourth outer magnetic pole portion are circumferentially close to the first outer magnetic pole portion 1a and the second outer magnetic pole portion 1b, respectively, of the first stator 1 and are spaced from the outer peripheral surface of the magnet 9 with a predetermined gap.

The cover 13 covers the component elements of the stepping motor as shown in FIG. 2. A hole 13a, a notch 13b, and a notch 13c are formed in the cover 13. The cover 13 is fixed to the flat plate portion 1c of the first stator 1 in a state in which the second stator 12 is fixed to an inner side of the second stator 12. The second bearing 14 is pressed into the hole 13a. An upper part of the first bobbin 5 and the two terminal pins 6 are exposed from the notch 13b. An upper part of the second bobbin 7 and the two terminal pins 8 are exposed from the notch 13c.

The second bearing 14 is made of a soft magnetic material and rotatably supports the rotary shaft 11 of the rotor. The second bearing 14 is comprised of a cylindrical portion and a fixed portion 14b which has a smaller diameter than that of the cylindrical portion. A shaft hole 14a is formed in the center of the cylindrical portion and the fixed portion 14b of the second bearing 14, and the rotary shaft 11 of the rotor is inserted into the shaft hole 14a. The second bearing 14 is fixed by, for example, pressing it into the hole 12f of the second stator 12 in a state in which the fixed portion 14b is inserted in the hole 13a of the cover 13. That is, the installed position of the second bearing 14 is determined by the cover 13, and the installed position of the second stator 12 is determined by the cover 13 and the second bearing 14.

In the stepping motor constructed as described above, the first stator 1 is constructed such that the first outer magnetic pole portion 1a and the second outer magnetic pole portion 1b are integral with the flat plate portion 1c. For this reason, errors in the relative positions of the first outer magnetic pole portion 1a and the second outer magnetic pole portion 1b can be reduced. Also, the second stator 12 is constructed such that the first outer tooth portion 12a and the second outer tooth portion 12b constituting the third outer magnetic pole portion and the third outer tooth portion 12c and the fourth outer tooth portion 12d constituting the fourth outer magnetic pole portion are integral with the flat plate portion 12e. Accordingly, errors in the relative positions of the third outer magnetic pole portion and the fourth outer magnetic pole portion can be reduced, and a variation in the performance of the stepping motor caused by assembly errors can be minimized.

The first stator 1 and the second stator 12 face each other with the rotor, which is comprised of the core 10 and the rotary shaft 11, and the magnet 9 interposed therebetween (see FIGS. 3 and 4). The second stator 12 is magnetically coupled to the first stator 1 via the second bearing 14, the rotary shaft 11, the core 10, and the first bearing 2.

Accordingly, when the first coil 3 is energized, the first outer magnetic pole portion 1a of the first stator 1 and the first outer tooth portion 12a and the second outer tooth portion 12b constituting the third outer magnetic pole portion of the second stator 12 are excited. Also, when the second coil 4 is energized, the second outer magnetic pole portion 1b of the first stator 1 and the third outer tooth portion 12c and the fourth outer tooth portion 12d constituting the fourth outer magnetic pole portion of the second stator 12 are excited.

In this case, the first outer magnetic pole portion 1a and the first and second outer tooth portions 12a, 12b are excited to opposite polarities, and the second outer magnetic pole portion 1b and the third and fourth outer tooth portions 12c, 12d are excited to opposite polarities. That is, the first outer magnetic pole portion 1a and the third outer magnetic pole portion are excited to opposite polarities, and the second outer magnetic pole portion 1b and the fourth outer magnetic pole portion are excited to opposite polarities.

The first coil 3 and the second coil 4 are arranged adjacently to the flat plate portion 1c of the first stator 1, and the second cylindrical portion 10b, the rotary shaft 11, and the first bearing 2 are arranged adjacently between the first coil 3 and the second coil 4. This arrangement can reduce the axial length of the stepping motor.

By fixing a gear, a lever, a screw, or the like, not shown, to the end of the rotary shaft 11 protruding axially from the first bearing 2, the rotational output of the stepping motor can be obtained from such a part.

The first outer magnetic pole portion 1a and the second outer magnetic pole portion 1b of the first stator 1 are opposed to the outer peripheral surface of the magnet 9 with a predetermined gap therebetween. A part of the core 10 which is opposed to the first outer magnetic pole portion 1a, the rotary shaft 11, and the first bearing 2 constitute a first inner magnetic pole portion. Similarly, a part of the core 10 which is opposed to the second outer magnetic pole portion 1b, the rotary shaft 11, and the first bearing 2 constitute a second inner magnetic pole portion.

Accordingly, when the first coil 3 is energized, the first outer magnetic pole portion 1a and the first inner magnetic pole portion are excited to opposite polarities, and a magnetic flux crossing the magnet 9 is generated between these magnetic pole portions to effectively act on the magnet 9. When the second coil 4 is energized, the second outer magnetic pole portion 1b and the second inner magnetic pole portion are excited to opposite polarities, and a magnetic flux crossing the magnet 9 is generated between these magnetic pole portions to effectively act on the magnet 9.

A magnetic circuit in which a magnetic flux from the first outer magnetic pole portion 1a of the first stator 1 passes through the magnet 9 and the first inner magnetic pole portion, and a magnetic circuit in which a magnetic flux from the second outer magnetic pole portion 1b of the first stator 1 passes through the magnet 9 and the second inner magnetic pole portion are referred to as first magnetic circuits.

As described earlier, the first outer tooth portion 12a and the second outer tooth portion 12b of the second stator 12 which constitute the third outer magnet pole portion and the third outer tooth portion 12c and the fourth outer tooth portion 12d of the second stator 12 which constitute the fourth outer magnet pole portion are opposed to the outer peripheral surface of the magnet 9 with a predetermined gap therebetween. Also, the first outer magnet pole portion 1a of the first stator 1 and the first and second outer tooth portions 12a, 12b which constitute the third outer magnet pole portion are circumferentially close to each other. The second outer magnetic pole portion 1b of the first stator 1 and the third and fourth outer tooth portions 12c, 12d of the second stator 12 which constitute the fourth outer magnet pole portion are circumferentially close to each other (see FIG. 5).

Accordingly, when the first coil 3 is energized, the first outer magnetic pole portion 1a and the third outer magnetic pole portion are excited to opposite polarities, and a magnetic flux from the first outer magnetic pole portion 1a flows toward the third outer magnetic pole portion. When the second coil 4 is energized, the second outer magnetic pole portion 1b and the fourth outer magnetic pole portion are excited to opposite polarities, and a magnetic flux from the second outer magnetic pole portion 1b flows toward the fourth outer magnetic pole portion.

A magnetic circuit in which a magnetic flux from the first outer magnetic pole portion 1a of the first stator 1 flows to the third outer magnetic pole portion through the air and then passes through the second bearing 14, rotary shaft 11, core 10, and first bearing 2, and a magnetic circuit in which the magnetic flux from the second outer magnetic pole portion 1b of the first stator 1 flows to the fourth outer magnetic pole portion through the air and then passes through the second bearing 14, rotary shaft 11, core 10, and first bearing 2 are referred to as second magnetic circuits.

As described above, the stepping motor according to the present embodiment is provided with the second stator 12 including the third outer magnetic pole portion and the fourth outer magnetic pole portion in addition to the first stator 1 including the first outer magnetic pole portion 1a and the second outer magnetic pole portion 1b, whereby the first and second magnetic circuits are formed. For this reason, many magnetic fluxes can be generated with a small amount of electric current, which makes it possible to increase the output of the stepping motor, reduce power consumption, and miniaturize coils.

In the first conventional example described above, since the first coil and the second coil excite the first stator and the second stator, respectively, errors in the relative positions of the first stator and the second stator directly affect the step angle accuracy of the stepping motor.

On the other hand, according to the present embodiment, the first coil 3 excites the first outer magnetic pole portion 1a of the first stator 1 and the third outer magnetic pole portion (the first outer tooth portion 12a and the second outer tooth portion 12b) of the second stator 12. Also, the second coil 4 excites the second outer magnetic pole portion 1b of the first stator 1 and the fourth outer magnetic pole portion (the third outer tooth portion 12c and the fourth outer tooth portion 12d) of the second stator 12. For this reason, errors in the relative positions of the first stator 1 and the second stator 12 are less likely to affect the step angle accuracy of the stepping motor. That is, the stepping motor with high output and high rotational accuracy can be realized.

In the present embodiment, since it is unnecessary to provide a gap between the core 10 constituting the inner magnetic pole portion inside the magnet 9 and the inner peripheral surface of the magnet 9, the distance between the first outer magnetic pole portion 1a of the first stator 1 and the core 10 and the distance between the second outer magnetic pole portion 1b of the first stator 1 and the core 10 can be reduced. Accordingly, the resistance of the magnetic circuit formed by the first coil 3, first outer magnetic pole portion 1a and first inner magnetic pole portion can be reduced, and the resistance of the magnetic circuit formed by the second coil 4, second outer magnetic pole portion 1b and second inner magnetic pole portion can be reduced. This increases the output of the stepping motor.

In the first conventional example described above, the first and second stators have to be constructed such that the inner magnetic pole portion is formed integrally with the outer magnetic pole portion. On the other hand, in manufacturing, it is difficult to make the inner magnetic pole portion and the outer magnetic pole portion out of the same parts. For example, these pole portions may be molded by metal injection molding, but this requires much cost. Also, as compared to the case where parts constituting only the outer magnetic pole portion are manufactured, fabricating the pole portions as an integral member by pressing becomes more difficult as their parts are smaller in size. Also, if the inner magnetic pole portion and the outer magnetic pole portion are manufactured separately and then integrally fixed to each other by caulking, welding, bonding, etc, the cost of manufacturing is high.

On the other hand, in the present embodiment where the core 10, rotary shaft 11, and first bearing 2 constitute the first inner magnetic pole portion and the second inner magnetic pole portion, the rotor additionally serves as the inner magnetic pole portion, thereby reducing the cost of manufacturing.

Also, in the present embodiment, the first stator 1 can be constructed by simply bending the first outer magnetic pole portion 1a and the second outer magnetic pole portion 1b into the axial direction of the motor, and the second stator 12 is constructed by simply bending the first to fourth outer tooth portions 12a to 12d into the axial direction of the motor. Accordingly, manufacturing can be facilitated, and the cost of manufacturing can be reduced.

Also, in the present embodiment where the magnet 9 is fixed to the outer peripheral surface of the core 10 as shown in FIG. 4, the magnet 9 has a higher mechanical strength than that of the stepping motor in the first conventional example described above. Also, the core 10 acts as a so-called back metal which can reduce magnetic resistance between the core 10 and the S and N poles generated on the inner periphery of the magnet 9, a high coefficient of permeance can be realized. For this reason, even when the stepping motor is used under high temperature conditions, the magnet 9 is unlikely to undergo magnetic deterioration caused by demagnetization.

According to the first conventional example, the stepping motor has to be assembled while maintaining the precision of the gaps between the outer peripheral surface of the magnet and the outer magnetic pole portion. In addition, those inner magnetic pole portions which are circumferentially positioned to face the inner peripheral surface of the magnet must be opposed to the magnet with predetermined gaps therebetween. For this reason, the gaps may not be secured due to a variation in part precision or lack of assembling accuracy, thus increasing the risk of causing a defect that the inner magnetic pole portions inadvertently contact the magnet.

On the other hand, according to the present embodiment, the gaps have to be controlled only with respect to the outer peripheral surface of the magnet 9, and therefore, the stepping motor can be assembled with ease.

According to the first conventional example, the inner magnetic pole portion has to be constructed such that the inner magnetic pole portions do not contact a portion through which the magnet and the output shaft are connected to each other, making it impossible to secure a sufficient axial length over which the inner magnetic pole portion is opposed to the magnet.

On the other hand, according to the present embodiment, a sufficient axial length can be secured over which the inner magnetic pole portions and the magnet 9 are opposed to each other, since the rotor additionally serves as the inner magnetic pole portions. Accordingly, the first outer magnetic pole portion 1a and the second outer magnetic pole portion 1b of the first stator 1 and the magnet 9 can be effectively used, and the output of the stepping motor can be increased.

If, for example, the outer magnetic pole portions are each comprised of a stator plate extending radial direction of the magnet, the magnet has to be planar, and the coils have to be wound in the direction of the radius. In this case, the stepping motor has a large outermost diameter even if it is short in axial length.

On the other hand, according to the present embodiment, the first outer magnetic pole portion 1a and the second outer magnetic pole portion 1b of the first stator 1 have a tooth shape extending axially of the motor. Accordingly, the outermost diameter (see L1 in FIG. 5, referred to later) of the stepping motor is determined depending on the diameter of the magnet 9, the thicknesses of the first outer magnetic pole portion 1a and the second outer magnetic pole portion 1b, and the winding widths of the first coil 3 and the second coil 4. As a result, the outermost diameter of the stepping motor can be minimized.

According to the present embodiment where the first and second outer magnetic pole portions are tooth-shaped, the first coil 3, the first bobbin 5, the second coil 4, the second bobbin 7, the magnet 9, and the rotor comprised of the core 10 and the rotary shaft 11 can be all installed from one direction (from top downward as viewed in FIG. 1). As a result, workability in assembling can be improved.

Referring next to FIGS. 5 to 8, a detailed description will be given of the operation of the stepping motor according to the present embodiment.

Figure 5:
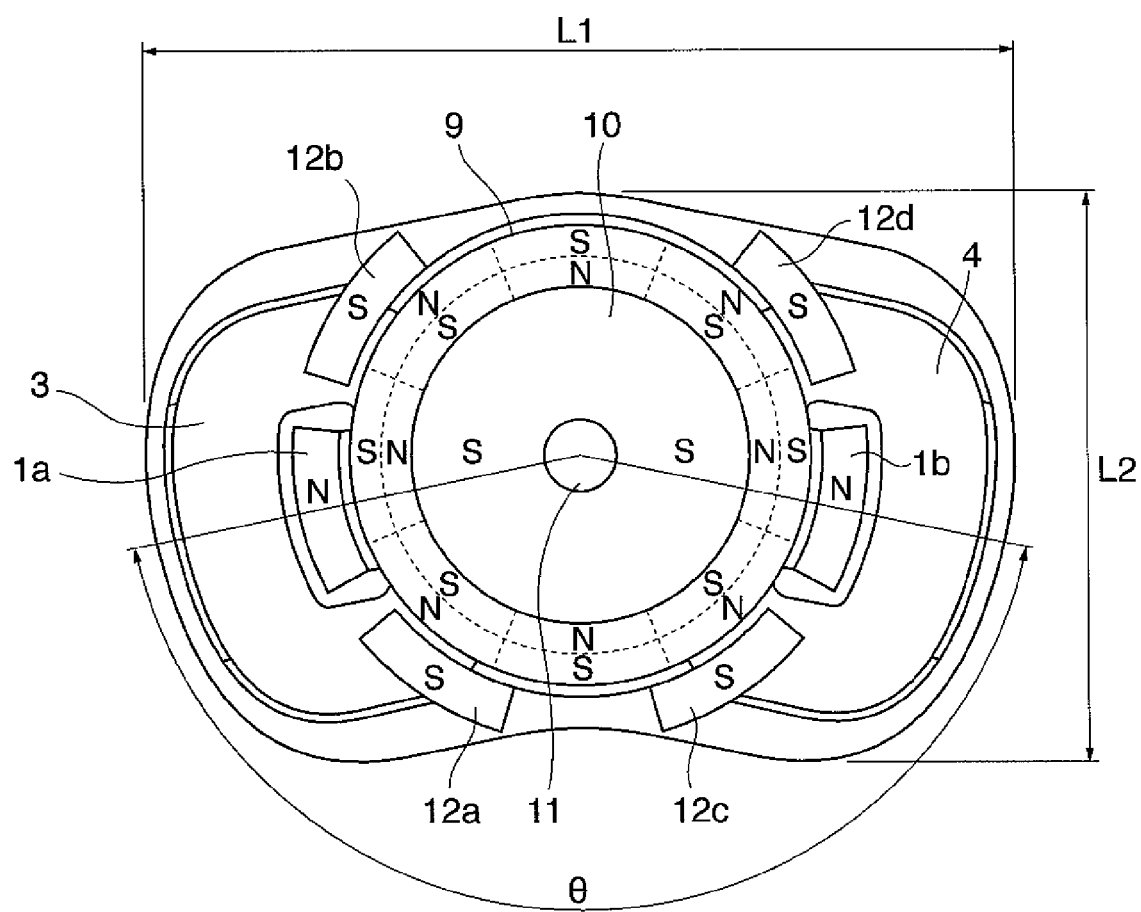
FIG. 5 is a top view showing the internal construction of the stepping motor in a first energized state.
Figure 6:
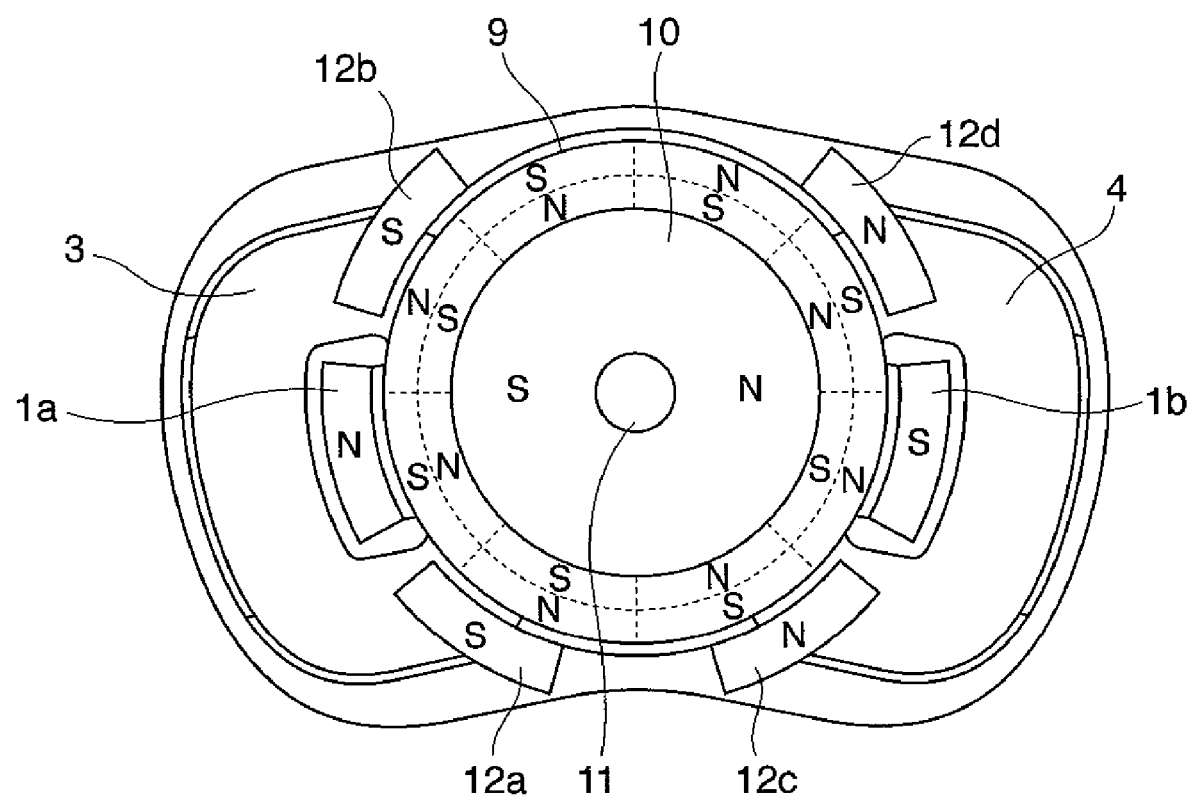
FIG. 6 is a top view showing the stepping motor in a second energized state.
Figure 7:
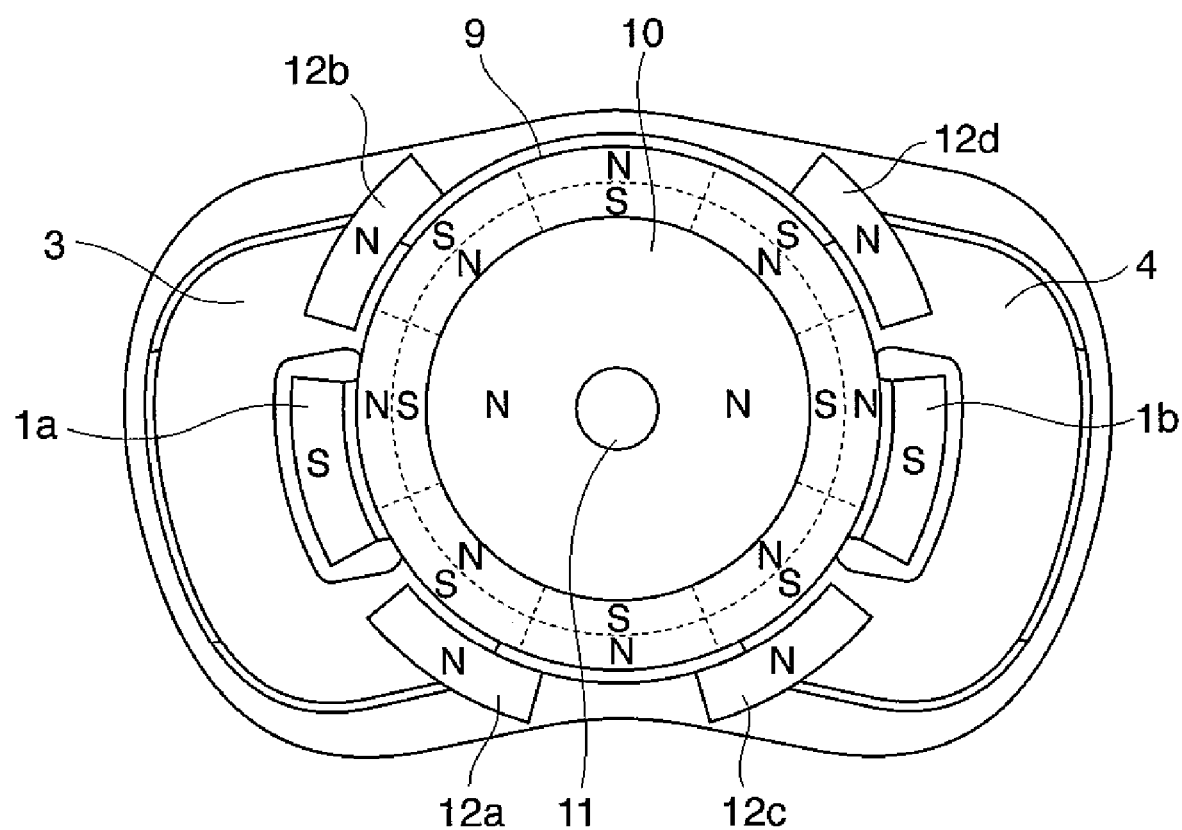
FIG. 7 is a top view showing the stepping motor in a third energized state.
Figure 8:
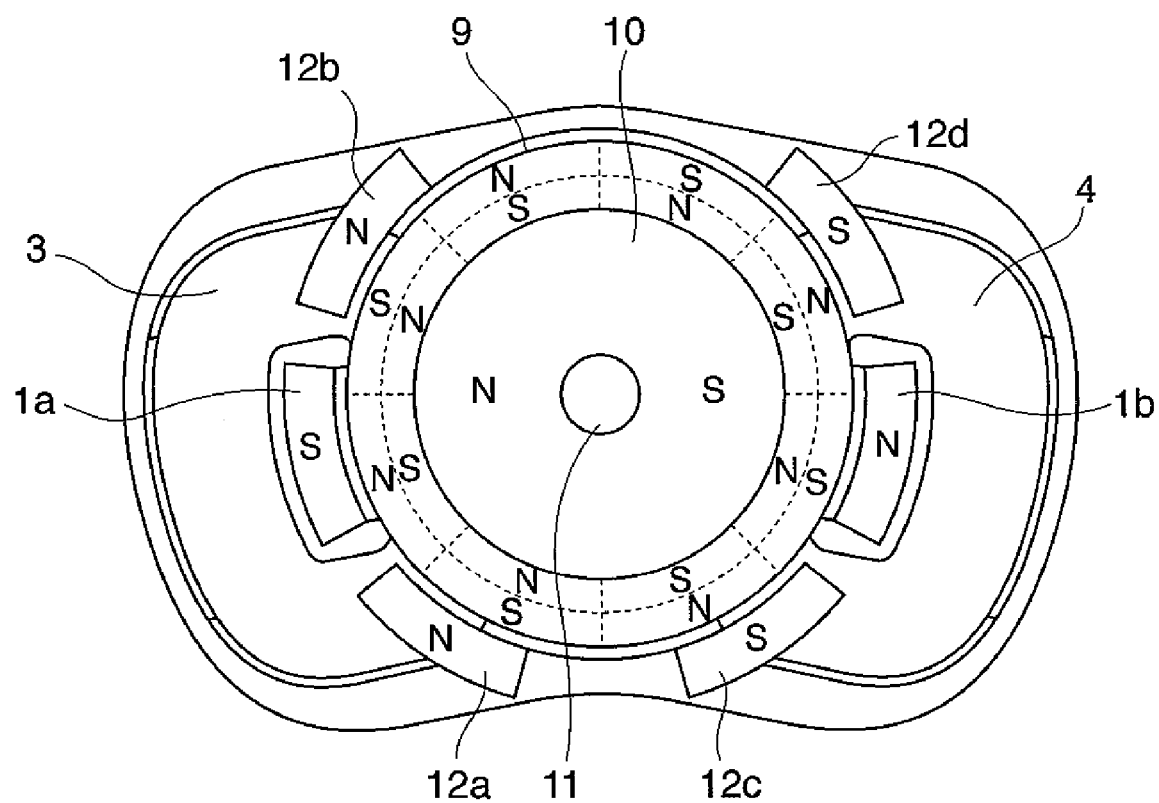
FIG. 8 is a top view showing the stepping motor in a fourth energized state.

FIG. 5 is a top view showing the internal construction of the stepping motor in a first energized state, FIG. 6 is a top view showing the stepping motor in a second energized state, FIG. 7 is a top view showing the stepping motor in a third energized state, and FIG. 8 is a top view showing the stepping motor in a fourth energized state.

As shown in FIG. 5, the outer peripheral side of the magnet 9 is multipolar-magnetized (in the present embodiment, the number of magnetized poles is 8) and alternately magnetized to the S-pole and the N-pole at equal angular intervals in the circumferential direction as described above. The inner peripheral side of the magnet 9 is magnetized to poles opposite to those of the outer peripheral side. A part of the magnet 9 having the S-pole on the outer circumferential side of the magnet has the N-pole on the inner peripheral side, and a part of the magnet 9 having the N-pole on the outer peripheral side has the S-pole on the inner peripheral side.

The first outer magnetic pole portion 1*a* and the second outer magnetic pole portion 1*b* of the first stator 1 are disposed at respective positions which are θ° out of phase with each other with respect to the rotation center of the magnet 9. Here, θ° is represented by "180°−°180/N (N is the number of magnetized poles)". Since N=8 in the present embodiment, θ° is 157.5°. When the relation of θ°=180°−°180/N is satisfied, the length L2 in FIG. 5 can be reduced.

The first and second outer magnetic pole portions 1*a*, 1*b* of the first stator 1 and the third and fourth outer magnetic pole portions of the second stator 12 face the magnet 9 over different angle ranges on the same plane orthogonal to the rotational axis of the magnet 9. Accordingly, the magnet 9 can be shortened in length as viewed in the axial direction of the motor. This can reduce the axial length of the stepping motor as a whole.

A description will now be given of the operation of the stepping motor with attention focused on a part of the outer peripheral surface of the magnet 9, which is a noticeable characteristic of the above described arrangement. Magnetic fluxes from the first outer magnetic pole portion 1*a* and the third external magnetic pole portion excited by the first coil 3 and magnetic fluxes from the second outer magnetic pole portion 1*b* and the fourth external magnetic pole portion excited by the second coil 4 alternately act on the part of the magnet 9. Thus, the outer magnetic pole portions cause their magnetic fluxes act on the same part of the magnet 9, stable performance can be realized without being affected by a variation in the magnetization of the magnet 9.

First, when the first coil 3 is energized in the normal direction, the first outer magnetic pole portion 1*a* is excited to the N-pole, the first outer tooth portion 12*a* and the second outer tooth portion 12*b* are excited to the S-poles, and the first inner magnetic pole portion (the part of the core 10 which is opposed to the first outer magnetic pole portion 1*a*) to the S-pole as shown in FIG. 5. Also, when the second coil 4 is energized in the normal direction, the second outer magnetic pole portion 1*b* is excited to the N-pole, the third outer tooth portion 12*c* and the fourth outer tooth portion 12*d* are excited to the S-poles, and the second inner magnetic pole portion (the part of the core 10 which is opposed to the second outer magnetic pole portion 1*b*) is excited to the S-pole as shown in FIG. 5 (first energized state).

Next, only the direction of energization of the second coil 4 is reversed from the state illustrated in FIG. 5 to thereby excite the second outer magnetic pole portion 1*b* to the S-pole, excite the third outer tooth portion 12*c* and the fourth outer tooth portion 12*d* to the N-poles, and excite the second inner magnetic pole portion to the N-pole. As a result, the magnet 9 rotates through an angle of 22.5° counterclockwise as shown in FIG. 6 (second energized state).

Next, only the direction of energization of the first coil 3 is reversed from the state illustrated in FIG. 6 to excite the first outer magnetic pole portion 1*a* to the S-pole, excite the first outer tooth portion 12*a* and the second outer tooth portion 12*b* to the N-poles, and excite the first inner magnetic pole portion to the N-pole. As a result, the magnet 9 further rotates through an angle of 22.5° counterclockwise as shown in FIG. 7 (third energized state).

Next, only the direction of energization of the second coil 4 is reversed from the state illustrated in FIG. 7 to excite the second outer magnetic pole portion 1*b* to the N-pole, excite the third outer tooth portion 12*c* and the fourth outer tooth portion 12*d* to the S-poles, and excite the first inner magnetic pole portion to the S-pole. As a result, the magnet 9 further rotates through an angle of 22.5° counterclockwise as shown in FIG. 8 (fourth energized state).

After that, the directions of energization of the first coil 3 and the second coil 4 are sequentially switched in a similar manner. As a result, the excitations of first outer magnetic pole portion 1*a* and the third outer magnetic pole portion (the first outer tooth portion 12*a* and the second outer tooth portion 12*b*) and the second outer magnetic pole portion 1*b* and the fourth outer magnetic pole portion (the third outer tooth portion 12*c* and the fourth outer tooth portion 12*d*) are switched at respective different times, so that the magnet 9 is rotated to the position corresponding to the phase of energization.

As described above, in the present embodiment, to bring the stepping motor in the first energized state, both the first coil 3 and the second coil 4 are energized in the normal direction. To bring the stepping motor in the second energized state, the first coil 3 is energized in the normal direction and the second coil 4 is energized in the reverse direction. To bring the stepping motor in the third energized state, both the first coil 3 and the second coil 4 are energized in the reverse direction. To bring the stepping motor in the fourth energized state, the first coil 3 is energized in the reverse direction and the second coil 4 is energized in the normal direction. That is, the magnet 9 is rotated by switching the energized state in the following order: the first energized state, the second energized state, the third energized state, and the fourth energized state.

The energized state may be switched as described below. To bring the stepping motor in a fifth energized state, both the first coil 3 and the second coil 4 are energized in the normal direction. To bring the stepping motor in a sixth energized state, the first coil 3 is energized in the normal direction and the second coil 4 is not energized. To bring the stepping motor in a seventh energized state, the first coil 3 is energized in the normal direction and the second coil 4 is energized in the reverse direction. To bring the stepping motor in an eighth energized state, the first coil 3 is not energized and the second coil 4 is energized in the reverse direction. That is, the energized state may be switched in the following order: the fifth energized state, the sixth energized state, the seventh energized state, and the eighth energized state. Consequently, the magnet 9 rotates to the position corresponding to the phase of energization.

Next, a description will be given of the phase relationship between the magnet 9 and the first outer magnetic pole portion 1*a*, the second outer magnetic pole portion 1*b*, the first outer tooth portion 12*a* and the second outer tooth portion 12*b* constituting the third outer magnetic pole portion, and the third outer tooth portion 12*c* and the fourth outer tooth portion 12*d* constituting the fourth outer magnetic pole portion.

As described above, when the energized state is switched in the order of the first energized state, the second energized state, the third energized state, and the fourth energized state, the polarities of the magnetic pole portions are sequentially switched to alternately excite the first outer magnetic pole portion 1*a* and the third outer magnetic pole portion and the second outer magnetic pole portion 1*b* and the fourth outer magnetic pole portion.

Referring to FIG. 5, when the first coil 3 is energized in the normal direction, the first outer magnetic pole portion 1*a* is excited to the N-pole, and the first outer tooth portion 12*a* and the second outer tooth portion 12*b* which constitute the third outer magnetic pole are excited to the S-poles. As a result, counterclockwise torque as viewed in FIG. 5 is generated in the magnet 9 so that the center of the first outer magnetic pole portion 1*a* and the center of the magnetized part of the magnet 9 (the center of the S-pole) can circumferentially coincide with each other, the center of the first outer tooth portion 12a and the center of the magnetized part of the magnet 9 (the center of the N-pole) can circumferentially coincide with each other, and the center of the second outer tooth portion 12b and the center of the magnetized part of the magnet 9 (the center of the N-pole) can circumferentially coincide with each other.

When the second coil 4 is energized in the normal direction at the same time when the first coil 3 is energized in the normal direction, the second outer magnetic pole portion 1b is excited to the N-pole, and the third outer tooth portion 12c and the fourth outer tooth portion 12d which constitute the fourth outer magnetic pole are excited to the S-poles. As a result, clockwise torque as viewed in FIG. 5 is generated in the magnet 9 so that the center of the second outer magnetic pole portion 1b and the center of the magnetized part of the magnet 9 (the center of the S-pole) can circumferentially coincide with each other, the center of the third outer tooth portion 12c and the center of the magnetized part of the magnet 9 (the center of the N-pole) can circumferentially coincide with each other, and the center of the fourth outer tooth portion 12d and the center of the magnetized part of the magnet 9 (the center of the N-pole) can circumferentially coincide with each other.

While the first coil 3 and the second coil 4 are being energized, the magnet 9 is standing still with its torque being well-balanced. This state is illustrated in FIG. 5.

When the first coil 3 and the second coil 4 are energized at the same level, the phase difference between the center of the first outer magnetic pole portion 1a and the center of the magnetized part of the magnet 9 (the center of the S-pole) is about 11.25°. Also, the phase difference between the center of the first outer tooth portion 12a and the center of the magnetized part of the magnet 9 (the center of the N-pole) is about 11.25°. Similarly, the phase difference between the center of the second outer tooth portion 12b and the center of the magnetized part of the magnet 9 (the center of the N-pole), the phase difference between the center of the second outer magnetic pole portion 1b and the center of the magnetized part of the magnet 9 (the center of the S-pole), the phase difference between the center of the third outer tooth portion 12c and the center of the magnetized part of the magnet 9 (the center of the N-pole), and the phase difference between the center of the fourth outer tooth portion 12d and the center of the magnetized part of the magnet 9 (the center of the N-pole) are all about 11.25°.

When the direction of energization of the second coil 4 is reversed from the state illustrated in FIG. 5, the second outer magnetic pole portion 1b is excited to the S-pole, and the third outer tooth portion 12c and the fourth outer tooth portion 12d which constitute the fourth outer magnetic pole portion are excited to the N-poles. As a result, counterclockwise torque as viewed in FIG. 5 is generated in the magnet 9. Specifically, the generated torque is such that the center of the second outer magnetic pole portion 1b and the center of the magnetized part of the magnet 9 (the center of the N-pole) can coincide with each other, the center of the third outer tooth portion 12c and the center of the magnetized part of the magnet 9 (the center of the S-pole) can coincide with each other, and the center of the fourth outer tooth portion 12d and the center of the magnetized part of the magnet 9 (the center of the S-pole) can coincide with each other.

At this time, the first coil 3 is kept energized in the normal direction, so that counterclockwise torque as viewed in FIG. 5 is generated in the magnet 9 as described below. Specifically, torque is generated so that the center of the first outer magnetic pole portion 1a and the center of the magnetized part of the magnet 9 (the center of the S-pole) can coincide with each other, the center of the first outer tooth portion 12a and the center of the magnetized part of the magnet 9 (the center of the N-pole) can coincide with each other, and the center of the second outer tooth portion 12b and the center of the magnetized part of the magnet 9 (the center of the N-pole) can coincide with each other. The magnet 9 starts rotating counterclockwise from the state illustrated in FIG. 5.

When the magnet 9 rotates through an angle of about 11.25° counterclockwise from the state illustrated in FIG. 5, the center of the first outer magnetic pole portion 1a and the center of the magnetized part of the magnet 9 (the center of the S-pole) are made coincide with each other, the center of the first outer tooth portion 12a and the center of the magnetized part of the magnet 9 (the center of the N-pole) are made coincide with each other, and the center of the second outer tooth portion 12b and the center of the magnetized part of the magnet 9 (the center of the N-pole) are made coincide with each other.

At this time, the center of the second outer magnetic pole portion 1b coincides with a boundary of the magnetized part of the magnet 9 (the boundary between the S-pole and the N-pole). Also, the center of the fourth outer tooth portion 12d coincides with a boundary of the magnetized part of the magnet 9 (the boundary between the S-pole and the N-pole).

In the magnet 9, torque for further rotating the magnet 9 counterclockwise is generated. When the magnet 9 further rotates through an angle of about 11.25 counterclockwise from this state (about 22.5° counterclockwise from the state illustrated in FIG. 5), the magnet 9 is stopped at this position with the torques generated by energization of the first coil 3 and the second coil 4 being well-balanced. This state is illustrated in FIG. 6.

When the direction of energization of the first coil 3 is reversed from the state illustrated in FIG. 6, the first outer magnetic pole portion 1a is excited to the S-pole, and the first outer tooth portion 12a and the second outer tooth portion 12d which constitute the third outer magnetic pole portion are excited to the N-poles. As a result, counterclockwise torque as viewed in FIG. 6 is generated in the magnet 9. Specifically, the generated torque is such that the center of the first outer magnetic pole portion 1a and the center of the magnetized part of the magnet 9 (the center of the N-pole) are made coincide with each other, the center of the first outer tooth portion 12a and the center of the magnetized part of the magnet 9 (the center of the S-pole) are made coincide with each other, and the center of the second outer tooth portion 12b and the center of the magnetized part of the magnet 9 (the center of the S-pole) are made coincide with to each other.

At this time, the second coil 4 is kept energized in the reverse direction, so that counterclockwise torque as viewed in FIG. 6 is generated in the magnet 9 as described below. Specifically, the torque is such that the center of the second outer magnetic pole portion 1b and the center of the magnetized part of the magnet 9 (the center of the N-pole) can correspond to each other, the center of the third outer tooth portion 12c and the center of the magnetized part of the magnet 9 (the center of the S-pole) can correspond to each other, and the center of the fourth outer tooth portion 12d and the center of the magnetized part of the magnet 9 (the center of the S-pole) can correspond to each other. The magnet 9 starts rotating counterclockwise from the state illustrated in FIG. 6.

When the magnet 9 rotates through an angle of about 11.25° counterclockwise from the state illustrated in FIG. 6, the center of the second outer magnetic pole portion 1b and the center of the magnetized part of the magnet 9 (the center of the N-pole) corresponds to each other, the center of the third outer tooth portion 12c and the center of the magnetized part of the magnet 9 (the center of the S-pole) corresponds to each other, and the center of the fourth outer tooth portion 12d and the center of the magnetized part of the magnet 9 (the center of the S-pole) corresponds to each other.

At this time, the center of the first outer magnetic pole portion 1a corresponds to a boundary of the magnetized part of the magnet 9 (the boundary between the S-pole and the N-pole). Also, the center of the second outer tooth portion 12b corresponds to a boundary of the magnetized part of the magnet 9 (the boundary between the S-pole and the N-pole).

In the magnet 9, torque for further rotating it counterclockwise is generated. When the magnet 9 further rotates through an angle of about 11.25 counterclockwise from this state (about 22.5° counterclockwise from the state illustrated in FIG. 5), the magnet 9 is stopped at this position with the torque generated by energization of the first coil 3 and the second coil 4 being well-balanced. This state is illustrated in FIG. 6.

When the direction of energization of the second coil 4 is reversed from the state illustrated in FIG. 7, the second outer magnetic pole portion 1b is excited to the N-pole, and the third outer tooth portion 12c and the fourth outer tooth portion 12d which constitute the fourth outer magnetic pole portion are excited to the S-poles. As a result, counterclockwise torque as viewed in FIG. 7 is generated in the magnet 9. Specifically, torque is generated so that the center of the second outer magnetic pole portion 1b and the center of the magnetized part of the magnet 9 (the center of the S-pole) can correspond to each other, the center of the third outer tooth portion 12c and the center of the magnetized part of the magnet 9 (the center of the N-pole) can correspond to each other, and the center of the fourth outer tooth portion 12d and the center of the magnetized part of the magnet 9 (the center of the N-pole) can correspond to each other.

At this time, the first coil 3 is kept energized in the reverse direction, so that counterclockwise torque as viewed in FIG. 7 is generated in the magnet 9 as described below. Specifically, torque is generated so that the center of the first outer magnetic pole portion 1a and the center of the magnetized part of the magnet 9 (the center of the N-pole) can correspond to each other, the center of the first outer tooth portion 12a and the center of the magnetized part of the magnet 9 (the center of the S-pole) can correspond to each other, and the center of the second outer tooth portion 12b and the center of the magnetized part of the magnet 9 (the center of the S-pole) can correspond to each other. The magnet 9 starts rotating counterclockwise from the state illustrated in FIG. 7.

When the magnet 9 rotates through an angle of about 11.25° counterclockwise from the state illustrated in FIG. 7, the center of the second outer magnetic pole portion 1b and the center of the magnetized part of the magnet 9 (the center of the N-pole) corresponds to each other, the center of the third outer tooth portion 12c and the center of the magnetized part of the magnet 9 (the center of the S-pole) corresponds to each other, and the center of the fourth outer tooth portion 12d and the center of the magnetized part of the magnet 9 (the center of the S-pole) corresponds to each other.

At this time, the center of the second outer magnetic pole portion 1b corresponds to a boundary of the magnetized part of the magnet 9 (the boundary between the S-pole and the N-pole). Also, the center of the fourth outer tooth portion 12d corresponds to a boundary of the magnetized part of the magnet 9 (the boundary between the S-pole and the N-pole).

In the magnet 9, torque for further rotating it counterclockwise is generated. When the magnet 9 further rotates through an angle of about 11.25 counterclockwise from this state (about 22.5° counterclockwise from the state illustrated in FIG. 5), the magnet 9 is stopped at this position with the torque generated by energization of the first coil 3 and the second coil 4 being well-balanced. This state is illustrated in FIG. 8.

As described above, since the magnetic flux generated by the first coil 3 passes between the first outer magnetic pole portion 1a opposed to the outer peripheral surface of the magnet 9 and the first inner magnetic pole portion of the rotor (the core 10 and the rotary shaft 11) fixed to the inner peripheral surface of the magnet 9 and therefore effectively acts on the magnet 9. The first inner magnetic pole portion of the rotor opposed to the inner peripheral surface of the magnet 9 does not have to be spaced from the inner peripheral surface of the magnet 9, and therefore, the distance between the outer magnetic pole portion and the inner magnetic pole portion can be reduced. This reduces magnetic reluctance and increases the output of the stepping motor.

The magnetic flux generated by the second coil 4 passes between the second outer magnetic pole portion 1b opposed to the outer peripheral surface of the magnet 9 and the second inner magnetic pole portion of the rotor fixed to the inner peripheral surface of the magnet 9, and therefore effectively acts on the magnet 9. The second inner magnetic pole portion of the rotor opposed to the inner peripheral surface of the magnet 9 does not have to be spaced from the inner peripheral surface of the magnet 9, and therefore, the distance between the outer magnetic pole portion and the inner magnetic pole portion can be reduced. This reduces magnetic reluctance and increases the output of the stepping motor.

That is, the magnetic flux generated by the first coil 3 crosses the magnet 9 disposed between the first outer magnetic pole portion 1a and the first inner magnetic portion, and the magnetic flux generated by the second coil 4 crosses the magnet 9 disposed between the second outer magnetic pole portion 1b and the second inner magnetic portion. Thus, the magnetic fluxes can effectively act on the magnet 9. This increases the output of the stepping motor.

Since the magnetic flux generated by the first coil 3 also acts on the third outer magnetic pole portion, and the magnetic flux generated by the second coil 4 also acts on the fourth outer magnetic pole portion, the output of the stepping motor can be further improved.

Since the core 10 (part opposed to the first outer magnetic pole portion 1a and the second outer magnetic pole portion 1b), rotary shaft 11, and first bearing 2 constitute the first inner magnetic pole portion and the second inner magnetic pole portion, the stepping motor can be manufactured with ease and at low cost as compared with the case where the outer magnetic pole portions and the inner magnetic pole portions are connected to each other or integrally constructed).

Further, the number of outer magnetic poles which are opposed to the outer periphery of the magnet 9 can be increased without increasing the outer diameter of the stepping motor, the torque balance of the magnet 9 can be improved, and therefore, making the stepping motor quiet.

As described above, according to the present embodiment, the small-sized and low-cost stepping motor which is short in the axial direction and has high output can be realized.

A description will now be given of a drive apparatus according to a second embodiment of the present invention.

Figure 9:
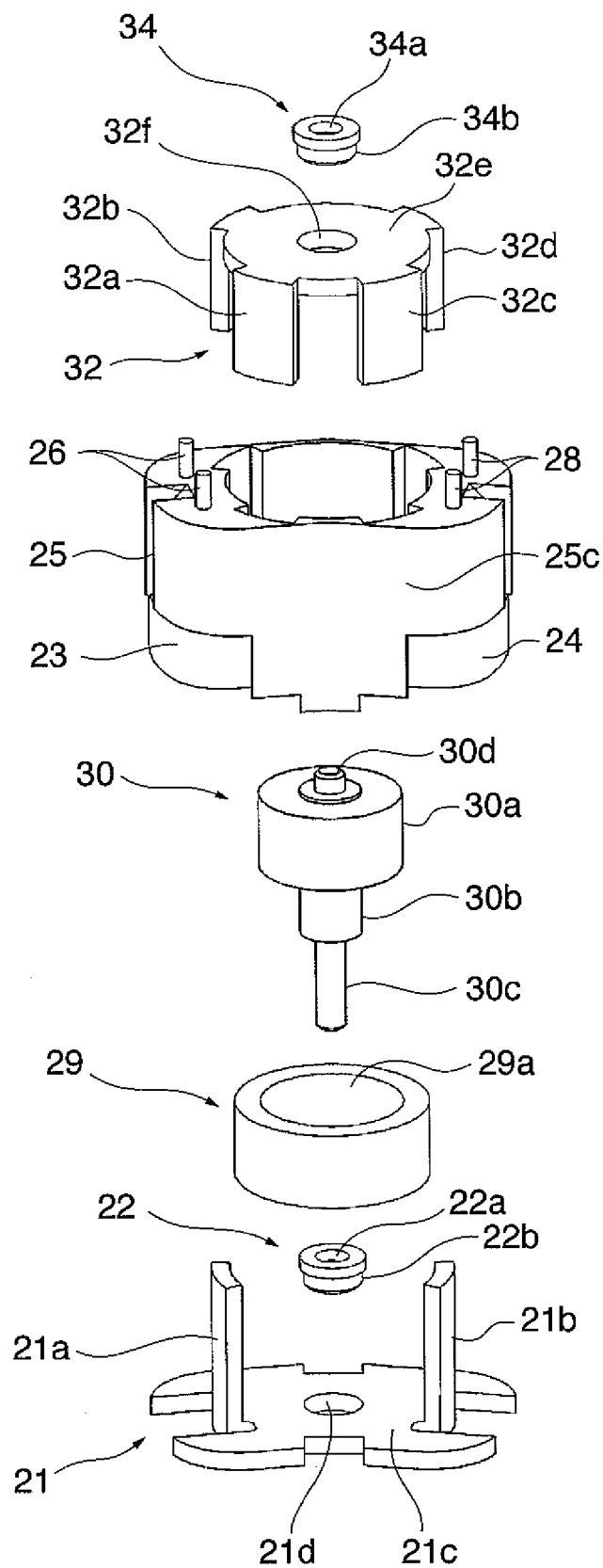
FIG. 9 is an exploded perspective view showing a stepping motor which is a drive apparatus according to a second embodiment of the present invention.
Figure 10:
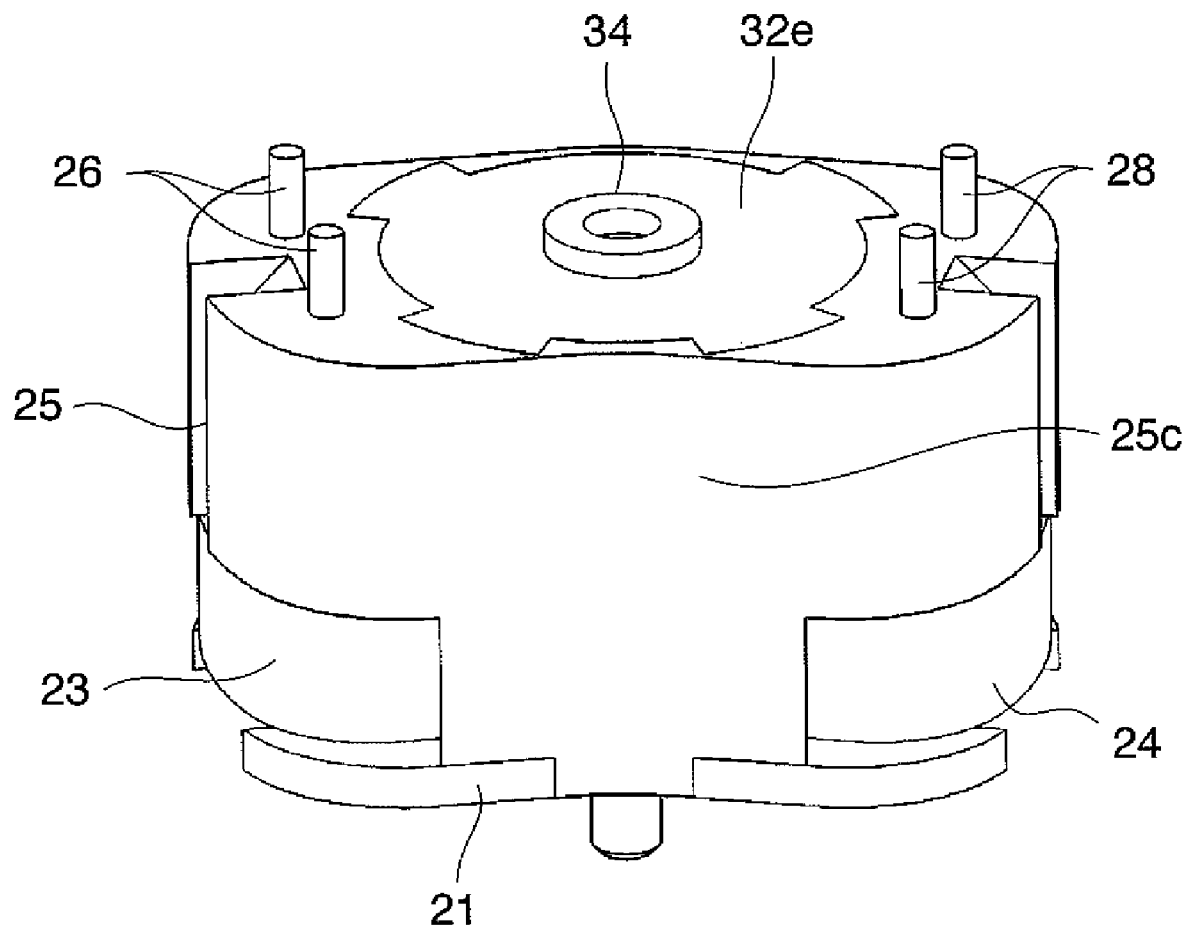
FIG. 10 is a perspective view showing the stepping motor in FIG. 9 in an assembled state.
Figure 11:
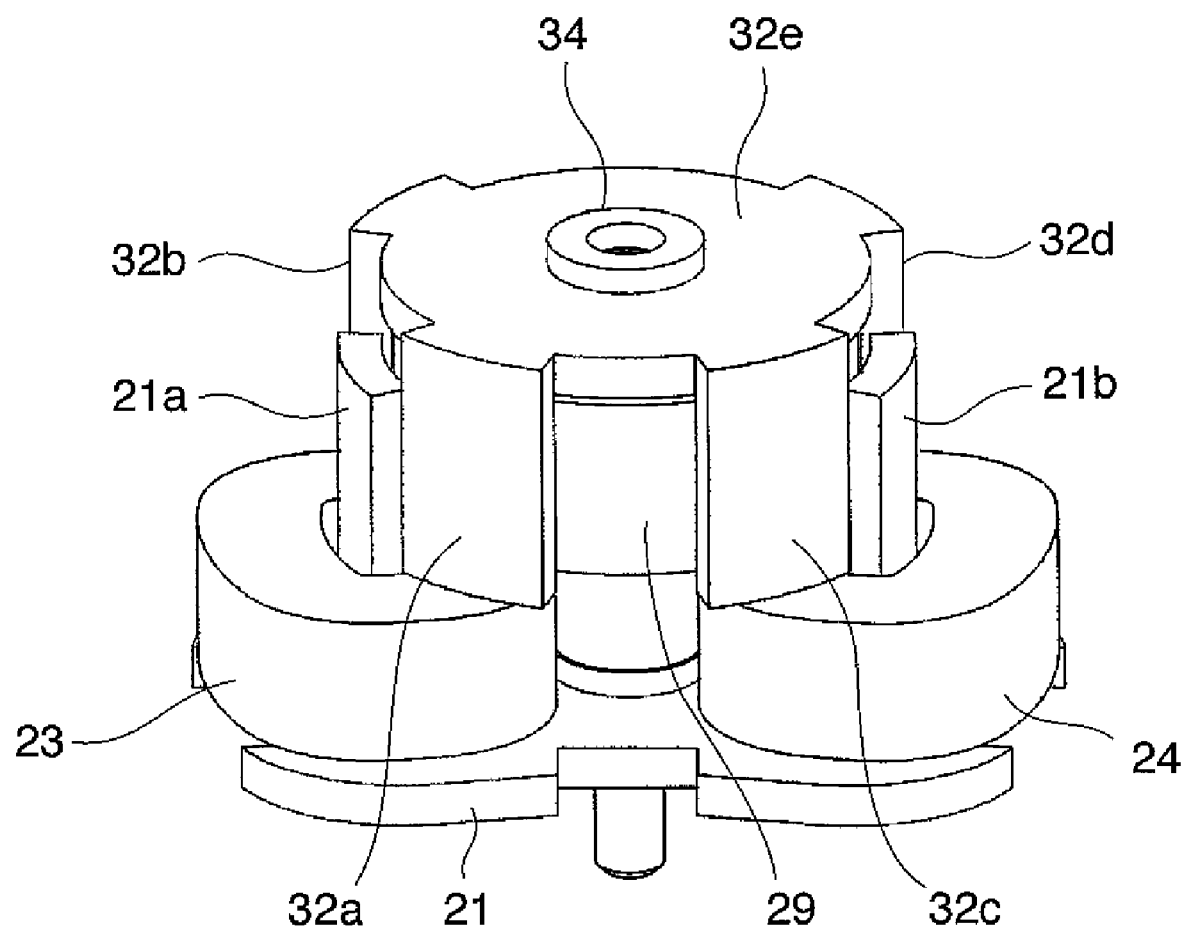
FIG. 11 is a perspective view showing the stepping motor in FIG. 9 with its bobbin omitted.
Figure 12:
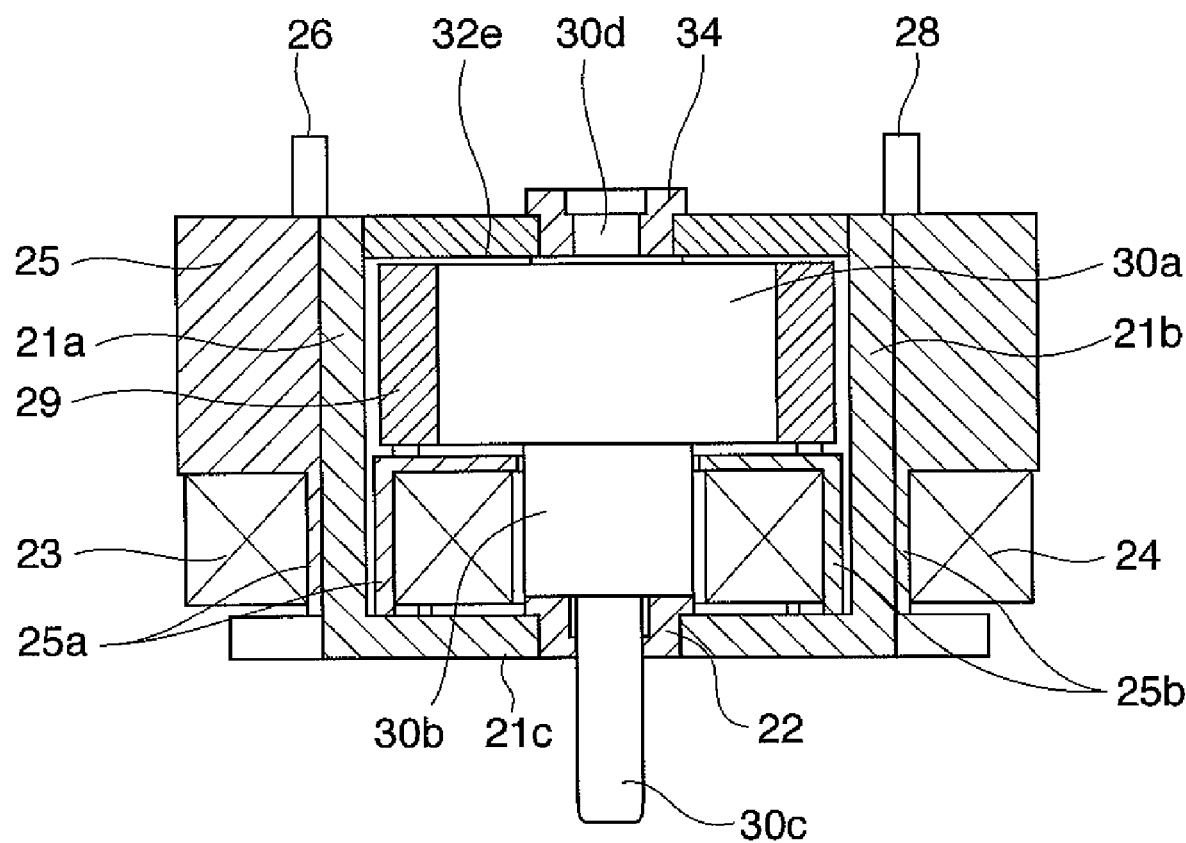
FIG. 12 is a longitudinal sectional view showing the internal construction of the stepping motor in FIG. 9.
Figure 13:
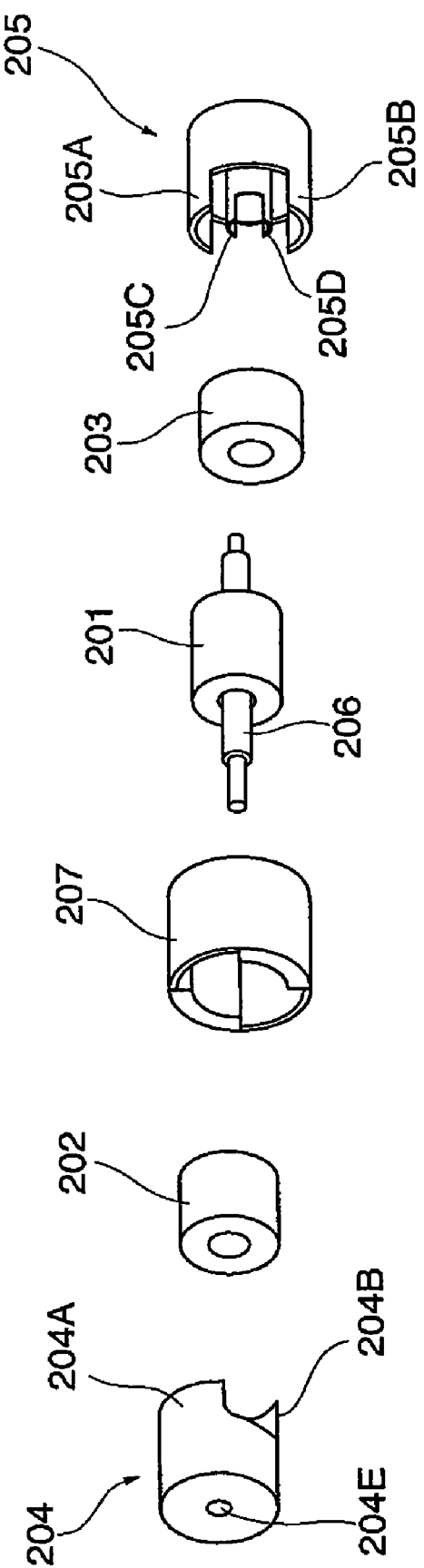
FIG. 13 is an exploded perspective view showing a stepping motor according to a first conventional example.
Figure 14:
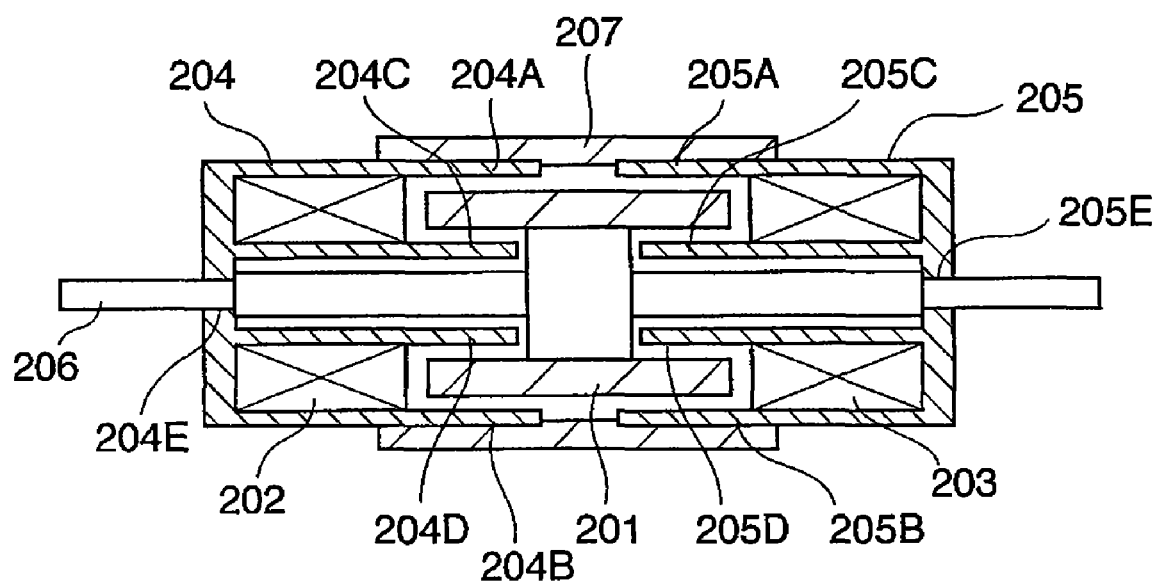
FIG. 14 is a longitudinal sectional view showing the internal construction of the stepping motor in FIG. 13 in an assembled state.

FIG. 9 is an exploded perspective view showing a stepping motor which is the drive apparatus according to the second embodiment. FIG. 10 is a perspective view showing the stepping motor in an assembled state. FIG. 11 is a perspective view showing the stepping motor with its bobbin omitted. FIG. 12 is a longitudinal sectional view showing the internal construction of the stepping motor.

As shown in FIGS. 9 to 12, the stepping motor is comprised of a first stator 21, a first bearing 22, a first coil 23, a second coil 24, a bobbin 25, a magnet 29, a rotor 30, a second stator 32, and a second bearing 34.

The present embodiment differs from the first embodiment described above in that the core 10 and the rotary shaft 11 are not manufactured separately and then fixed to each other, but the rotor 30 comprised of a core and a rotary shaft formed integrally with each other in advance, and in that one bobbin 25 is used in place of the first bobbin 5 and the second bobbin 6 and is provided with a cover portion to eliminate the need for a dedicated cover. The other elements of the present embodiment are identical with the corresponding ones of the first embodiment, and therefore, description thereof is simplified or omitted.

The first stator 21 is made of a soft magnetic material and is comprised of first and second tooth-shaped outer magnetic pole portions 21a, 21b, and a flat plate portion 21c which is formed into an inverted-V shape with an open angle θ and formed with a hole 21d.

The first bearing 22 is made of a soft magnetic material and rotatably support the rotor 30. A shaft hole 22a is formed in the center of the first bearing 22, and a fixed portion 22b of the first bearing 22 inserted into the hole 21d of the first stator 21.

The bobbin 25 is comprised of a first bobbin portion 25a, a second bobbin portion 25b, and a cover portion 25c. The cover portion 25c is fixed on the flat plate portion 21c of the first stator 21 and covers the outer peripheral surface of the magnet 29 and constitutes part of the outer appearance of the stepping motor. The first bobbin portion 25a is formed integrally with the cover portion 25c and sandwiches the first outer magnetic pole portion 21a of the first stator 21 from outside. The second bobbin portion 25b is formed integrally with the cover portion 25c and sandwiches the second outer magnetic pole portion 21b of the first stator 21 from outside.

The first coil 23 is wound around the first bobbin portion 25a, and the second coil 24 is wound around the second bobbin portion 25b. The first bobbin portion 25a is notched so as to expose the first outer magnetic pole portion 21a of the first stator 21 (see FIGS. 10 and 12). The second bobbin portion 25b is notched so as to expose the second outer magnetic pole portion 21b of the first stator 21 (see FIGS. 10 and 12). The cover portion 25c is provided with two terminal pins 26 to which respective ends of the first coil 23 are connected and two terminal pins 28 to which respective ends of the second coil 24 are connected.

The magnet 29 is alternately magnetized to an S-pole and an N-pole so that the number of permanently magnetized poles can be N (in the present embodiment, N=8). The magnet 29 is fixed to the outer peripheral surface of a first cylindrical portion 30a of the rotor 30, described later, by bonding, for example, so that the axial end face of the magnet 29 can be flush with that of the first cylindrical portion 30a.

The rotor 30 is made of a soft magnetic material and comprised of the first cylindrical portion 30a, a second cylindrical portion 30b, a first shaft portion 30c, and a second shaft portion 30d. That is, the rotor 30 is comprised of a core (corresponding to the first cylindrical portion 30a and the second cylindrical portion 30b) and a rotary shaft (the first shaft portion 30c and the second shaft portion 30d) which are formed into one piece.

The first cylindrical portion 30a is fixed to an inner peripheral surface 29a of the magnet 29. The second cylindrical portion 30b is disposed between the first coil 23 and the second coil 24. The first shaft portion 30c is rotatably supported by the first bearing 22. The second shaft portion 30d is rotatably supported by the second bearing 34. The position of the rotor 30 in the axial direction of the motor is limited by the first bearing 22 and the second bearing 34 with a predetermined gap therebetween (see FIG. 12).

The second stator 32 is made of a soft magnetic material and comprised of a first outer tooth portion 32a, a second outer tooth portion 32b, a third outer tooth portion 32c, a fourth outer tooth portion 32d, and a flat plate portion 32e having a hole 32f. In the assembled state, the first to fourth outer tooth portions 32a to 32d face the first and second outer magnetic pole portions 21a and 21b of the first stator 21. The first outer tooth portion 32a and the second outer tooth portion 32b form a third outer magnetic pole portion, and the third outer tooth portion 32c and the fourth outer tooth portion 32d form a fourth outer magnetic pole portion.

The second bearing 34 is made of a soft magnetic material and comprised of a cylindrical portion and a fixed portion 34b. A shaft hole 34a which rotatably supports the second shaft portion 30d of the rotor 30 is formed in the cylindrical portion and the fixed portion 34b. The fixed portion 34b is pressed into the hole 32f of the second stator 32.

The present embodiment has features (differences) described below as compared with the first embodiment described above. The bobbin 25 is fixedly positioned on the first stator 21, and the second stator 32 is fixedly positioned on the bobbin 25 with the magnet 29 and the rotor 30 interposed therebetween. The bobbin 25 has both the first coil 23 and the second coil 24 wound thereon and cooperates with the second stator 32 to cover the outer peripheral surface of the magnet 29, thereby eliminating the need for a dedicated cover.

In the stepping motor constructed as described above, the first stator 21 is constructed such that the first outer magnetic pole portion 21a and the second outer magnetic pole portion 21b are formed integrally with the flat plate portion 21c. Accordingly, errors in the relative positions of the first outer magnetic pole portion 21a and the second outer magnetic pole portion 21b can be reduced. Also, the second stator 32 is constructed such that the first outer tooth portion 32a and the second outer tooth portion 32b constituting the third outer magnetic pole portion and the third outer tooth portion 32c and the fourth outer tooth portion 32d constituting the fourth outer magnetic pole portion are integral with the flat plate portion 32e. Accordingly, errors in the relative positions of the third outer magnetic pole portion and the fourth outer magnetic pole portion can be reduced, and a variation in the performance of the stepping motor caused by assembly errors can be minimized.

The first stator 21 and the second stator 32 face each other with the magnet 29 and the rotor 30 interposed therebetween (see FIGS. 11 and 12). The second stator 32 is magnetically coupled to the first stator 21 via the second bearing 34, the rotor 30, and the first bearing 22. Accordingly, when the first coil 23 is energized, the first outer magnetic pole portion 21a and the first and second outer tooth portions 32a, 32b constituting the third outer magnetic pole portion are excited. Also, when the second coil 24 is energized, the second outer magnetic pole portion 21b and the third and fourth outer tooth portions 32c, 32d constituting the fourth outer magnetic pole portion are excited.

In this case, the first outer magnetic pole portion 21a and the first and second outer tooth portions 32a, 32b are excited to opposite polarities, and the second outer magnetic pole portion 21b and the third and fourth outer tooth portions 32c, 32d are excited to opposite polarities. That is, the first outer magnetic pole portion 21a and the third outer magnetic pole portion are excited to opposite polarities from each other, and the second outer magnetic pole portion 21b and the fourth outer magnetic pole portion are excited to opposite polarities from each other.

The first coil 23 and the second coil 24 are arranged adjacently to the flat plate portion 21c of the first stator 21, and the second cylindrical portion 30b of the rotor 30 and the first bearing 22 are arranged adjacently to each other between the first coil 23 and the second coil 24. This arrangement can reduce the axial length of the stepping motor.

Further, by fixing a gear, a lever, a screw, or the like, not shown, to the end of the first shaft portion 30c of the rotor 30 protruding axially from the first bearing 22, the rotational output of the stepping motor can be obtained from such a part.

The first outer magnetic pole portion 21a and the second outer magnetic pole portion 21b are opposed to the outer peripheral surface of the magnet 29 with a predetermined gap therebetween. A part of the rotor 30 which is opposed to the first outer magnetic pole portion 21a, and the first bearing 22 constitute a first inner magnetic pole portion. Similarly, a part of the rotor 30 which is opposed to the second outer magnetic pole portion 21b, and the first bearing 22 constitute a second inner magnetic pole portion.

Accordingly, when the first coil 23 is energized, the first outer magnetic pole portion 21a and the first inner magnetic pole portion are excited to opposite polarities, and a magnetic flux crossing the magnet 29 is generated between these magnetic pole portions to effectively act on the magnet 29. Similarly, when the second coil 24 is energized, the second outer magnetic pole portion 21b and the second inner magnetic pole portion are excited to opposite polarities, and a magnetic flux crossing the magnet 29 is generated between these magnetic pole portions to effectively act on the magnet 29.

A magnetic circuit in which a magnetic flux from the first outer magnetic pole portion 21a of the first stator 21 passes through the magnet 29 and the first inner magnetic pole portion, and a magnetic circuit in which a magnetic flux from the second outer magnetic pole portion 21b of the first stator 21 passes through the magnet 29 and the second inner magnetic pole portion are referred to as first magnetic circuits.

As described earlier, the first and second outer tooth portions 32a, 32b which constitute the third outer magnet pole portion and the third and fourth outer tooth portions 32c, 32d which constitute the fourth outer magnet pole portion are opposed to the outer peripheral surface of the magnet 29 with a predetermined gap therebetween. Also, the first outer magnet pole portion 21a and the first and second outer tooth portions 32a, 32b which constitute the third outer magnet pole portion are circumferentially close to each other. The second outer magnetic pole portion 21b and the third and fourth outer tooth portions 32c, 32d which constitute the fourth outer magnet pole portion are circumferentially close to each other.

Accordingly, when the first coil 23 is energized, the first outer magnetic pole portion 21a and the third outer magnetic pole portion are excited to opposite polarities, and a magnetic flux from the first outer magnetic pole portion 21a flows toward the third outer magnetic pole portion. When the second coil 24 is energized, the second outer magnetic pole portion 21b and the fourth outer magnetic pole portion are excited to opposite polarities, and a magnetic flux from the second outer magnetic pole portion 21b flows toward the fourth outer magnetic pole portion.

A magnetic circuit in which a magnetic flux from the first outer magnetic pole portion 21a of the first stator 21 flows to the third outer magnetic pole portion through the air and then passes through the second bearing 34, rotor 30, and first bearing 22, and a magnetic circuit in which the magnetic flux from the second outer magnetic pole portion 21b of the first stator 21 flows to the fourth outer magnetic pole portion through the air and then passes through the second bearing 34, rotor 30, and first bearing 22 are referred to as second magnetic circuits.

As described above, the stepping motor according to the present embodiment is constructed such that the second stator 32 including the third outer magnetic pole portion and the fourth outer magnetic pole portion is provided in addition to the first stator 21 including the first outer magnetic pole portion 21a and the second outer magnetic pole portion 21b, to thereby form the first and second magnetic circuits. Accordingly, many magnetic fluxes can be generated with only a small amount of electric current, which makes it possible to increase the output of the stepping motor, reduce power consumption, and miniaturize coils.

In the first conventional example described above, since the first coil and the second coil excite the first stator and the second stator, respectively, errors in the relative positions of the first stator and the second stator directly affect the step angle accuracy of the stepping motor.

On the other hand, according to the present embodiment, the first coil 23 excites the first outer magnetic pole portion 21a of the first stator 21 and the third outer magnetic pole portion (the first outer tooth portion 32a and the second outer tooth portion 32b) of the second stator 32. Also, the second coil 24 excites the second outer magnetic pole portion 21b of the first stator 21 and the fourth outer magnetic pole portion (the third outer tooth portion 32c and the fourth outer tooth portion 32d) of the second stator 32. Accordingly, errors in the relative positions of the first stator 21 and the second stator 32 are less likely to affect the step angle accuracy of the stepping motor. That is, the stepping motor with high output and high rotational accuracy can be realized.

In the present embodiment, it is unnecessary to provide a gap between the rotor 30 constituting the inner magnetic pole portion inside the magnet 29 and the inner peripheral surface of the magnet 29. This makes it possible to reduce the distance between the first outer magnetic pole portion 21a of the first stator 21 and the rotor 30 and the distance between the second outer magnetic pole portion 21b of the first stator 21 and the rotor 30. Accordingly, the magnetic resistance of the magnetic circuit formed by the first coil 23, first outer magnetic pole portion 21a and first inner magnetic pole portion can be reduced, and the magnetic resistance of the magnetic circuit formed by the second coil 24, second outer magnetic pole portion 21b and second inner magnetic pole portion can be reduced, increasing the output of the stepping motor.

Further, in the present embodiment, the rotor 30 and the first bearing 22 constitute the first inner magnetic pole portion and the second inner magnetic pole portion, and therefore, the rotor 30 additionally serves as the inner magnetic pole portion, to realize a reduction in the cost of manufacturing.

In the present embodiment, the first stator 21 can be constructed by simply bending the first outer magnetic pole portion 21a and the second outer magnetic pole portion 21b into the axial direction of the motor, and the second stator 32 is constructed by simply bending the first to fourth outer tooth portions 32a to 32d into the axial direction of the motor. Accordingly, manufacturing can be facilitated, and the cost of manufacturing can be reduced.

In the first conventional example described above, the first and second stators have to be constructed such that the inner magnetic pole portion is formed integrally with the outer magnetic pole portion, but in manufacturing, it is difficult to make the inner magnetic pole portion and the outer magnetic pole portion out of the same parts. For example, these pole portions may be molded by metal injection molding, but this requires much cost. Also, as compared to the case where parts constituting only the outer magnetic pole portion are manufactured, fabricating the pole portions as an integral member by pressing becomes more difficult as their parts are smaller in size. Also, if the inner magnetic pole portion and the outer magnetic pole portion are manufactured separately and then integrally fixed to each other by caulking, welding, bonding, etc, the cost of manufacturing is high.

On the other hand, in the present embodiment, since the magnet 29 is fixed to the periphery of the first cylindrical portion 30a of the rotor 30 (see FIG. 12), the magnet 29 has a higher mechanical strength than that of the stepping motor in the first conventional example described above. Also, the rotor 30 acts as a so-called back metal which can reduce magnetic resistance between the rotor 30 and the S-pole and the N-pole generated on the inner periphery of the magnet 29, a high coefficient of permeance can be realized. For this reason, even when the stepping motor is used under high temperature conditions, the magnet 29 is unlikely to undergo magnetic deterioration caused by demagnetization.

According to the first conventional example, the stepping motor has to be assembled while maintaining the precision of the gaps between the outer peripheral surface of the magnet and the outer magnetic pole portion, and moreover, the inner magnetic pole portions circumferentially opposed to the inner peripheral surface of the magnet has to be arranged so as to face the magnet with a predetermined gap therebetween. For this reason, the gap may not be secured due to a variation in part precision or lack of assembling accuracy, thus increasing the risk of causing a defect that an inner magnetic pole portion inadvertently contacts the magnet.

On the other hand, according to the present embodiment, the gaps have to be controlled only with respect to the outer periphery of the magnet 9, and therefore, the stepping motor can be assembled with ease.

Further, according to the first conventional example, the inner magnetic pole portion has to be constructed such that the inner magnetic pole portions do not contact a portion through which the magnet and the output shaft are connected to each other, making it impossible to secure a sufficient axial length over which the inner magnetic pole portion is opposed to the magnet.

On the other hand, according to the present embodiment, a sufficient axial length can be secured over which the inner magnetic pole portions and the magnet 29 are opposed to each other, since the rotor 30 additionally serves as the inner magnetic pole portions. Accordingly, the first outer magnetic pole portion 21a and the second outer magnetic pole portion 21b of the first stator 21 and the magnet 29 can be effectively used, and the output of the stepping motor can be increased.

Further, if, for example, the outer magnetic pole portions are each comprised of a stator plate extending in the radial direction of the magnet, the magnet has to be planar, and the coils have to be wound in the direction of the radius. In this case, the stepping motor is large in outermost diameter even if it has a short axial length.

On the other hand, according to the present embodiment, the first outer magnetic pole portion 21a and the second outer magnetic pole portion 21b of the first stator 21 have a tooth shape extending in the axial direction of the motor. For this reason, the outermost diameter of the stepping motor is determined depending on the diameter of the magnet 29, the thicknesses of the first outer magnetic pole portion 21a and the second outer magnetic pole portion 21b, and the winding widths of the first coil 23 and the second coil 24. As a result, the outermost diameter of the stepping motor can be minimized.

According to the present embodiment, since the first and second outer magnetic pole portions are tooth-shaped, the first coil 23, the second coil 24, the bobbin 25, the magnet 29, and the rotor 30 can be all installed from one direction (from top downward as viewed in FIG. 9). As a result, workability in assembling can be improved.

As described above, the magnetic flux generated by the first coil 23 crosses the magnet 29 disposed between the first outer magnetic pole portion 21a of the first stator 21 and the first inner magnetic portion, and the magnetic flux generated by the second coil 24 crosses the magnet 29 disposed between the second outer magnetic pole portion 21b of the first stator 21 and the second inner magnetic portion. Thus, the magnetic fluxes can effectively act on the magnet 29. This increases the output of the stepping motor.

Since the magnetic flux generated by the first coil 23 also acts on the third outer magnetic pole portion, and the magnetic flux generated by the second coil 24 also acts on the fourth outer magnetic pole portion, the output of the stepping motor can be further improved.

Since the number of outer magnetic poles which are opposed to the outer periphery of the magnet 29 can be increased without increasing the outer diameter of the stepping motor, the torque balance of the magnet 29 can be improved, making the stepping motor quiet.

Further, the bobbin 25 has both the first coil 23 and the second coil 24 wound thereon and additionally serves as the cover which covers the outer peripheral surface of the magnet 29, whereby the number of parts and cost can be reduced.

As described above, according to the present embodiment, the stepping motor can be realized which is small in size, short in axial length, low in cost, and high in output.

It should be understood that the present invention is not limited to the embodiments described above, but various changes in or to the above described embodiments may be possible without departing from the spirits of the present invention. For example, although in the first and second embodiments, the stepping motors have been described, the present invention may be applied to driving sources for various mechanisms in various apparatuses such as an image pickup apparatus.

This application claims priority from Japanese Patent Application No. 2005-214899 filed Jul. 25, 2005, which is hereby incorporated by reference herein.

What is claimed is:

1. A motor comprising:
   a cylindrical magnet that is circumferentially multipolar-magnetized, said magnet having inner and outer peripheral surfaces;
   a rotor made of a soft magnetic material and fixed to the inner peripheral surface of said magnet, said rotor including a rotary shaft;
   a first stator having first and second outer magnetic pole portions disposed at respective positions which are phase-shifted from each other by a predetermined angle with respect to a rotation center of said magnet, said first and second outer magnetic pole portions being opposed to the outer peripheral surface of said magnet with a predetermined gap therebetween;
   a second stator having third and fourth outer magnetic pole portions disposed at positions circumferentially close to said first and second outer magnetic pole portions, respectively, said third and fourth outer magnetic pole portions being opposed to the outer peripheral surface of said magnet with a predetermined gap therebetween;

a first bearing that bears one end of the rotary shaft of said rotor and made of soft magnetic material;

a second bearing that bears the other end of the rotary shaft of said rotor and made of soft magnetic material;

a first annular coil that excites said first and third outer magnetic pole portions; and a second annular coil that excites said second and fourth outer magnetic pole portions, wherein said first and second stators comprise first and second flat plate portions, respectively, extending orthogonally to said rotary shaft of said rotor, wherein said first and second outer magnetic pole portions extend from said first flat plate portion opposing said third and fourth outer magnetic pole portions, respectively, and said third and fourth outer magnetic pole portions extend from said second flat plate portion opposing said first and second outer magnetic pole portions, respectively, wherein said first stator holds said first bearing, and said second stator holds said second bearing, with said second flat plate portion of said second stator extending over said rotor and supporting the rotary shaft of the rotor via the second bearing, and wherein said first and second stators are magnetically coupled to each other via said second bearing, the rotary shaft of said rotor, said core, and said first bearing.

2. A motor comprising:

a cylindrical magnet that is circumferentially multipolar-magnetized, said magnet having inner and outer peripheral surfaces;

a rotor comprising a core made of a soft magnetic material fixed to the inner peripheral surface of said magnet, and a rotary shaft attached to said core;

a first bearing made of the soft magnetic material and supporting one end of said rotary shaft;

a second bearing made of the soft magnetic material and supporting the other end of said rotary shaft;

a first stator having first and second outer magnetic pole portions disposed at respective positions which are phase-shifted from each other by a predetermined angle with respect to a rotation center of said magnet, said first and second outer magnetic pole portions being opposed to the outer peripheral surface of said magnet with a predetermined gap therebetween, said first stator rotatably supporting one end of said rotary shaft of said rotor via said first bearing;

a second stator having third and fourth outer magnetic pole portions disposed at positions circumferentially close to said first and second outer magnetic pole portions, respectively, said third and fourth outer magnetic pole portions being opposed to the outer peripheral surface of said magnet with a predetermined gap therebetween, said second stator rotatably supporting the other end of said rotary shaft of said rotor via said second bearing;

a first annular coil that excites said first and third outer magnetic pole portions; and a second annular coil that excites said second and fourth outer magnetic pole portions, wherein:

said first and second stators are magnetically coupled to each other via said rotary shaft of said rotor and said first and second bearings, a first magnetic circuit is formed in which each of magnetic fluxes from said first and second outer magnetic pole portions passes through said magnet to an inner magnetic pole portion, which is composed of parts of the core opposed to said first and second outer magnetic pole portions, said first bearing, and said rotary shaft, and a second magnetic circuit is formed in which each of said magnetic fluxes from said first and second outer magnetic pole portions flows to said third and fourth outer magnetic pole portions through air, and then passes through said second bearing, said rotary shaft, said core, and said first bearing.

3. A motor according to claim 2, wherein said first stator holds said first bearing, and said second stator holds said second bearing.

4. A motor according to claim 2, wherein said first coil and said second coil are disposed adjacent to said magnet in an axial direction of said rotor.

5. A motor according to claim 2, wherein an angle contained between said first and second outer magnetic pole portions with respect to a rotation center of said rotor is set to $180°-180°/N$, when the number of magnetized poles which are magnetized by said cylindrical magnet is designated by N.

6. A motor according to claim 2, wherein said second stator has first and second outer tooth portions and third and fourth outer tooth portions, the first and second outer tooth portions sandwich said first outer magnetic pole portion in a circumferential direction of the magnet, and the third and fourth outer tooth portions sandwich said second outer magnetic pole portion in a circumferential direction of the magnet.

* * * * *

UNITED STATES PATENT AND TRADEMARK OFFICE
CERTIFICATE OF CORRECTION

| | | |
|---|---|---|
| PATENT NO. | : 7,781,924 B2 | Page 1 of 1 |
| APPLICATION NO. | : 11/459813 | |
| DATED | : August 24, 2010 | |
| INVENTOR(S) | : Mizumaki | |

It is certified that error appears in the above-identified patent and that said Letters Patent is hereby corrected as shown below:

On the Title Page, Item (54) and Col. 1, line 1, Title should read as follows:

REMOVE: ELECTROMAGNETIC DRIVING APPARATUS

INSERT -- A MOTOR WITH STATORS SUPPORTING ROTARY SHAFT ROTOR --

Signed and Sealed this

Second Day of November, 2010

David J. Kappos
*Director of the United States Patent and Trademark Office*